US009790662B2

(12) United States Patent
Ota et al.

(10) Patent No.: US 9,790,662 B2
(45) Date of Patent: Oct. 17, 2017

(54) HYBRID-TYPE WORKING MACHINE

(71) Applicant: Hitachi Construction Machinery Co., Ltd., Taito-ku, Tokyo (JP)

(72) Inventors: Yasunori Ota, Tsuchiura (JP); Mitsugu Ojima, Tsuchiura (JP); Shuji Egawa, Tsuchiura (JP); Yuji Azuma, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/124,111

(22) PCT Filed: Mar. 6, 2015

(86) PCT No.: PCT/JP2015/056696
§ 371 (c)(1),
(2) Date: Sep. 7, 2016

(87) PCT Pub. No.: WO2016/017200
PCT Pub. Date: Feb. 4, 2016

(65) Prior Publication Data
US 2017/0016206 A1    Jan. 19, 2017

(30) Foreign Application Priority Data

Jul. 28, 2014 (JP) ................................. 2014-152864

(51) Int. Cl.
*E02F 9/20* (2006.01)
*B60K 6/485* (2007.10)
(Continued)

(52) U.S. Cl.
CPC ............ *E02F 9/2075* (2013.01); *B60K 6/485* (2013.01); *E02F 9/0858* (2013.01);
(Continued)

(58) Field of Classification Search
CPC ......... E02F 9/2075; E02F 3/32; E02F 9/0858; E02F 9/0866; E02F 9/123; E02F 9/2091; E02F 9/2095
See application file for complete search history.

(56) References Cited

U.S. PATENT DOCUMENTS 8,798,875 B2 * 8/2014 Yanagisawa ........... B60K 6/365
                                                    37/411
9,108,516 B2 * 8/2015 Sugiyama ................ B60K 6/12
(Continued)

FOREIGN PATENT DOCUMENTS

JP    2012-26142 A    2/2012
JP    2012-77513 A    4/2012
(Continued)

OTHER PUBLICATIONS

International Search Report (PCT/ISA/210) issued in PCT Application No. PCT/JP2015/056696 dated May 19, 2015 with English-language translation (four (4) pages).
(Continued)

*Primary Examiner* — Brian Swenson
(74) *Attorney, Agent, or Firm* — Crowell & Moring LLP

(57) ABSTRACT

An assist generator motor is driven by an engine to generate power or assists in a drive of the engine by supply of power from an electricity storage device. A revolving electric motor is driven by power supplied from the electricity storage device or supplies regeneration power generated by a regeneration operation to the electricity storage device. The assist generator motor is controlled by a first inverter. The revolving electric motor is controlled by a second inverter. The first inverter and the second inverter are mounted on a support bracket elastically supported on a revolving frame in a position different from a position where the electricity storage device is mounted.

6 Claims, 12 Drawing Sheets

(51) Int. Cl.
*E02F 9/08* (2006.01)
*E02F 9/12* (2006.01)
*E02F 3/32* (2006.01)

(52) U.S. Cl.
CPC ............ *E02F 9/0866* (2013.01); *E02F 9/123* (2013.01); *E02F 9/2091* (2013.01); *E02F 9/2095* (2013.01); *B60Y 2200/412* (2013.01); *E02F 3/32* (2013.01); *Y10S 903/903* (2013.01)

(56) References Cited

U.S. PATENT DOCUMENTS

| | | |
|---|---|---|
| 2009/0199553 A1 | 8/2009 | Nishimura et al. |
| 2011/0093150 A1 | 4/2011 | Yanagisawa et al. |
| 2011/0242769 A1 | 10/2011 | Trine et al. |
| 2013/0108404 A1 | 5/2013 | Okumura et al. |
| 2016/0168821 A1* | 6/2016 | Naito ....................... B60K 1/00 180/65.21 |
| 2017/0058485 A1* | 3/2017 | Yoshino ................ E02F 9/0883 |

FOREIGN PATENT DOCUMENTS

| | | |
|---|---|---|
| JP | 2013-165607 A | 8/2013 |
| WO | WO 2008/015798 A1 | 2/2008 |
| WO | WO 2009/125833 A1 | 10/2009 |

OTHER PUBLICATIONS

Japanese-language Written Opinion (PCT/ISA/237) issued in PCT Application No. PCT/JP2015/056696 dated May 19, 2015 (four (4) pages).

\* cited by examiner

HYBRID-TYPE WORKING MACHINE

TECHNICAL FIELD

The present invention relates to working machines such as hydraulic excavators and wheel-type hydraulic excavators and the like, and particularly to a hybrid-type working machine using both an engine and an electric machinery (electric motor) together as a power source.

BACKGROUND ART

In general, a hydraulic excavator as a representative example of a working machine used at a construction site and the like, is provided with a vehicle body comprising an automotive lower traveling structure and an upper revolving structure that is mounted on the lower traveling structure to be able to revolve thereon. A working mechanism for performing an operation such as an excavating operation and the like is mounted on the front side of the upper revolving structure.

On the other hand, there is known a hybrid-type working machine using both an engine and an electric motor together, as a working machine such as a hydraulic excavator and the like. This hybrid-type working machine includes an engine, an assist generator motor that is driven by the engine to generate power or assists in a driving force of the engine by supply of power thereto from an electricity storage device, the electricity storage device that stores the power generated by the assist generator motor or discharges the power therein, and an inverter for controlling an operation of the assist generator motor (Patent Document 1).

PRIOR ART DOCUMENT

Patent Document

Patent Document 1: WO2008/015798

SUMMARY OF THE INVENTION

Incidentally, in the hybrid-type working machine according to the aforementioned conventional art, the electricity storage device and the inverter are united to be configured as an electric unit. Therefore, when the electricity storage device or the inverter is replaced, both the electricity storage device and the inverter are required to be integrally removed from a vehicle body. In this case, since a plurality of cables and lines are mounted in the electricity storage device and the inverter, a work of removing the plurality of cables and lines is necessary. As a result, there is a problem that the replacement work for the electricity storage device or the inverter is burdensome and workability of the replacement work deteriorates.

The present invention is made in view of the aforementioned problems in the conventional art, and an object of the present invention is to provide a hybrid-type working machine that can mount an inverter thereon compactly and facilitate a removal work of the inverter.

In order to solve the aforementioned problems, the present invention is applied to a hybrid-type working machine comprising: an automotive vehicle body provided with a working mechanism; an engine that is disposed on the vehicle body and drives a hydraulic pump; a first electric motor that is driven by the engine to generate power or assists in a drive of the engine by supply of power; an electricity storage device that stores power generated by the first electric motor or discharges power therein; a second electric motor that is driven by power supplied from the electricity storage device or supplies regeneration power generated by a regeneration operation to the electricity storage device; a first inverter for controlling an operation of the first electric motor; and a second inverter for controlling an operation of the second electric motor.

The configuration that the present invention adopts is characterized in that: the first inverter and the second inverter are mounted on a support bracket elastically supported on the vehicle body in a position different from a position where the electricity storage device is mounted.

With this arrangement, the first inverter and the second inverter are mounted on the support bracket in the position different from the position where the electricity storage device is mounted. Therefore, the first inverter and the second inverter can be mounted compactly on the vehicle body through the support bracket. Along with this, it is possible to improve workability on the replacement work of the first and second inverters and the electricity storage device. Since the support bracket can elastically support the first and second inverters together on the vehicle body, it is not necessary to provide a vibration isolating member to each of the first inverter and second inverter. Therefore, it is possible to improve the assembling performance of the first inverter and second inverter and reduce the costs.

BRIEF DESCRIPTION OF THE DRAWINGS

FIG. 3 is an enlarged plan view showing the revolving frame, the electricity storage device, an inverter unit and the like.

FIG. 5 is a perspective view showing the revolving frame, a front partition plate, the electricity storage device, the inverter unit and the like.

MODE FOR CARRYING OUT THE INVENTION

Hereinafter, an embodiment of hybrid-type working machine according to the present invention will be in detail explained with reference to the accompanying drawings by taking a case in which the hybrid-type working machine is applied to a hydraulic excavator as an example.

Figure 1:
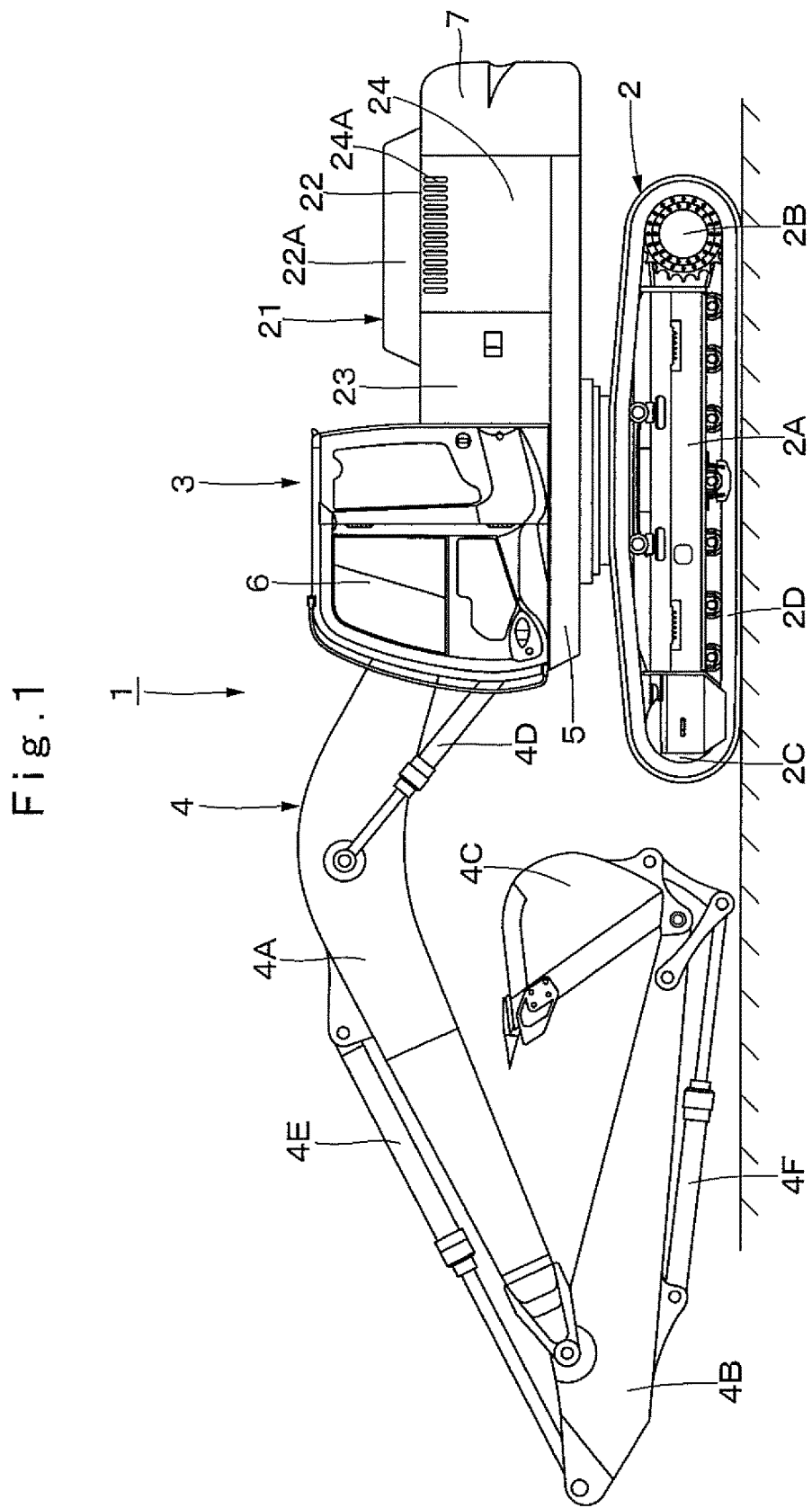
FIG. 1 is a front view showing a hydraulic excavator as a hybrid-type working machine applied to a first embodiment of the present invention.

FIG. 1 to FIG. 10 show a first embodiment of a hybrid-type working machine according to the present invention. In FIG. 1, indicated at 1 is a hybrid-type hydraulic excavator as a representative example of hybrid-type working machines. A vehicle body of the hydraulic excavator 1 comprises an automotive lower traveling structure 2 of a crawler type and an upper revolving structure 3 that is mounted on the lower traveling structure 2 to be capable of revolving thereon. A working mechanism 4 is provided in the front side of the upper revolving structure 3 to be capable of lifting and tilting thereto, and the hydraulic excavator 1 can perform an excavating operation of earth and sand and the like by using the working mechanism 4.

The lower traveling structure 2 comprises a track frame having left and right side frames 2A (the left side only is shown), a drive wheel 2B provided on one side of each of the side frames 2A in the front-rear direction (length direction), an idler wheel 2C provided on the other side thereof in the front-rear direction and a crawler belt 2D wound around and between the drive wheel 2B and the idler wheel 2C. The left and right drive wheels 2B are driven by left and right traveling hydraulic motors 2E, 2F (refer to FIG. 10) to drive the crawler belts 2D for rotation, thus causing the hydraulic excavator 1 to travel.

The working mechanism 4 comprises a boom 4A mounted on a front part side of a revolving frame 5 to be described later to be capable of lifting and tiling thereto, an arm 4B rotatably mounted on a tip end side of the boom 4A, a bucket 4C rotatably mounted on a tip end side of the arm 4B, and a boom cylinder 4D, an arm cylinder 4E and a bucket cylinder 4F, which are respectively composed of hydraulic cylinders for driving them.

The upper revolving structure 3 comprises the revolving frame 5 as a base, a cab 6, a counterweight 7, an engine 8, a hydraulic pump 9, an assist generator motor 12, a heat exchanger 13, an electricity storage device 25, a revolving motor 27 and an inverter unit 31, which will be described later, mounted on the revolving frame 5.

The cab 6 defining an operator's room is provided in a front part and left side of the revolving frame 5. An operator's seat on which an operator sits is provided in the cab 6, and a traveling operation lever and a working operation lever (both are not shown) are provided in the periphery of the operator's seat. On the other hand, the counterweight 7 is provided in a rear end side of the revolving frame 5 to act as a weight balance to the working mechanism 4.

Figure 3:
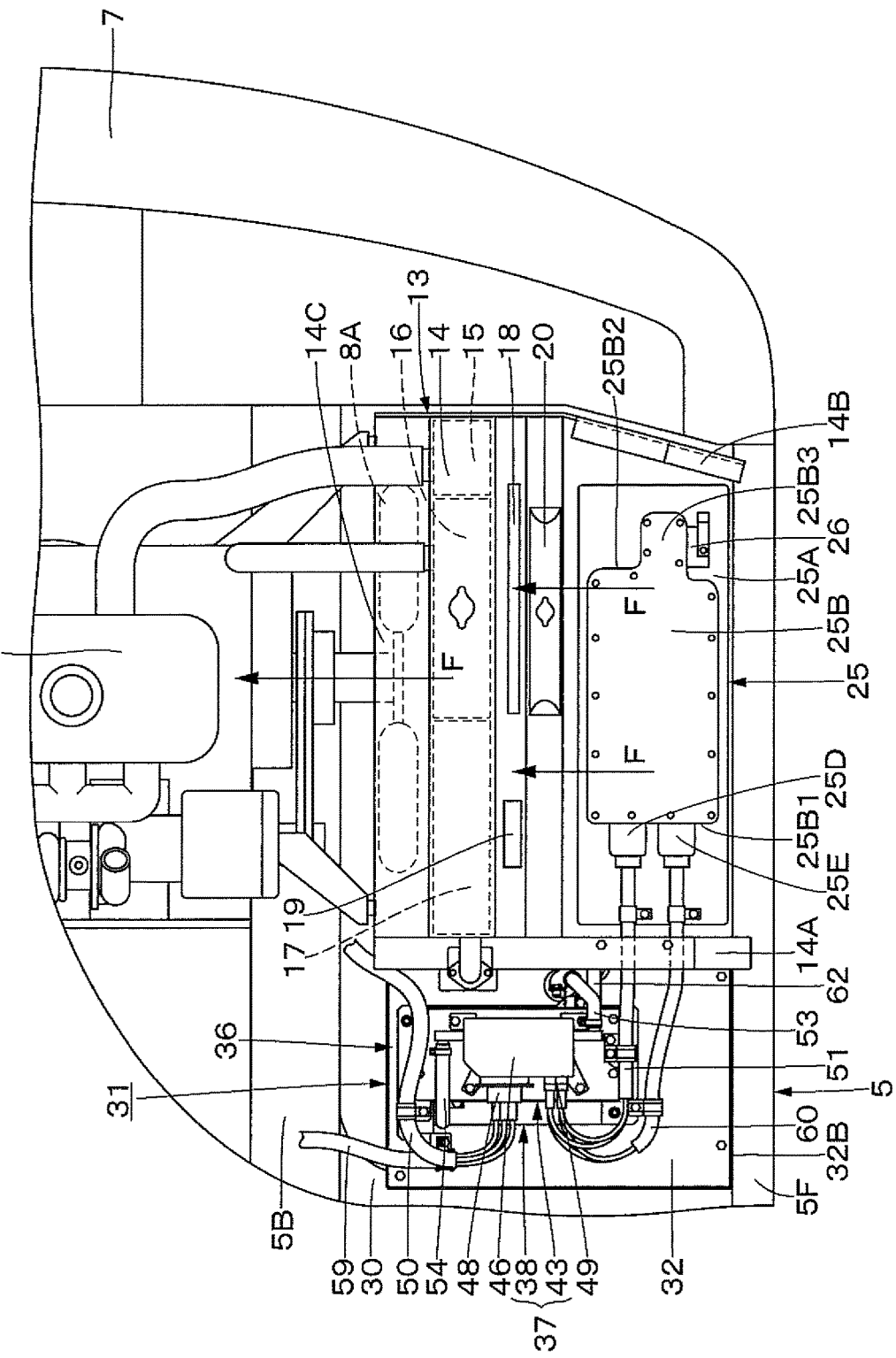

The engine 8 is positioned in the front side of the counterweight 7 and is disposed in the rear side of the revolving frame 5. The engine 8 is mounted on the revolving frame 5 in a horizontal state where an axis line of a crank shaft (not shown) extends in the left-right direction. The hydraulic pump 9 and the assist generator motor 12, which will be described later, are mounted in the right side of the engine 8 in one side in the left-right direction. On the other hand, a suction type cooling fan 8A is mounted in the left side of the engine 8 in the other side in the left-right direction (at the opposite side to the hydraulic pump 9). The cooling fan 8A is driven/rotated by the engine 8 to suck outside air from an air inlet port 24A formed in a left rear side door 24 to be described later. As shown in FIG. 3, this outside air is supplied to the engine 8, and the heat exchanger 13 and the electricity storage device 25, which will be described later, and the like as cooling air F.

The hydraulic pump 9 is mounted in the right side (output side) of the engine 8. The hydraulic pump 9 is driven by the engine 8 to supply operating pressurized oil to various kinds of hydraulic actuators including the left and right traveling hydraulic motors 2E, 2F, the respective cylinders 4D, 4E, 4F and a revolving hydraulic motor 28 to be described later, which are mounted on the hydraulic excavator 1. A hydraulic oil tank 10 is provided in the front side of the hydraulic pump 9. The hydraulic oil tank 10 reserves therein hydraulic oil to be supplied to the hydraulic actuators. A control valve 11 (refer to FIG. 10) is composed of a collector of a plurality of directional control valves, and controls directions of the pressurized oil to be supplied to the various kinds of hydraulic actuators from the hydraulic pump 9 in response to an operation of the operation lever disposed in the cab 6.

The assist generator motor 12 is mounted in the right side of the engine 8 together with the hydraulic pump 9. The assist generator motor 12 configures a first electric motor according to the present invention. The assist generator motor 12 is driven by the engine 8 to generate power or assists in a drive of the engine 8 by supply of power from the electricity storage device 25 to be described later. That is, the assist generator motor 12 has a function of an electric generator that is driven by the engine 8 to generate power and a function of an electric motor that assists in a drive of the engine 8 by supply of power from the electricity storage device 25 to be described later.

The heat exchanger 13 is positioned in the left side of the engine 8 and is mounted on the revolving frame 5. As shown in FIG. 3, the heat exchanger 13 is positioned upstream side of the cooling fan 8A in the flow direction of the cooling air F. The heat exchanger 13 is configured as a single unit including a support frame 14 mounted on the revolving frame 5, an intercooler 15 assembled to the support frame 14, a radiator 16 for engine, an oil cooler 17, a condenser 18 for air conditioner, a fuel cooler 19 and a radiator 20 for hybrid equipment.

The support frame 14 comprises a front partition plate 14A that is disposed in the front side of the heat exchanger 13 (closer to the cab 6) and extends in the left-right direction and in the upper-lower direction, a rear partition plate 14B that is disposed in the rear side of the heat exchanger 13 along a left front surface part of the counterweight 7 and extends in the left-right direction and in the upper-lower direction, and a connecting member 14C that extends in the front-rear direction to connect upper parts of the front and rear partition plate 14A, 14B and covers upper parts of the intercooler 15, the radiator 16 for engine and the oil cooler 17.

The intercooler 15 for cooling air (compressed air) compressed by a turbocharger, the radiator 16 for engine for cooling engine cooling water, the oil cooler 17 for cooling hydraulic oil, the condenser 18 for air conditioner for cooling a cooling medium for air conditioner and the fuel cooler 19 for cooling fuel are assembled on the support frame 14.

Figure 2:
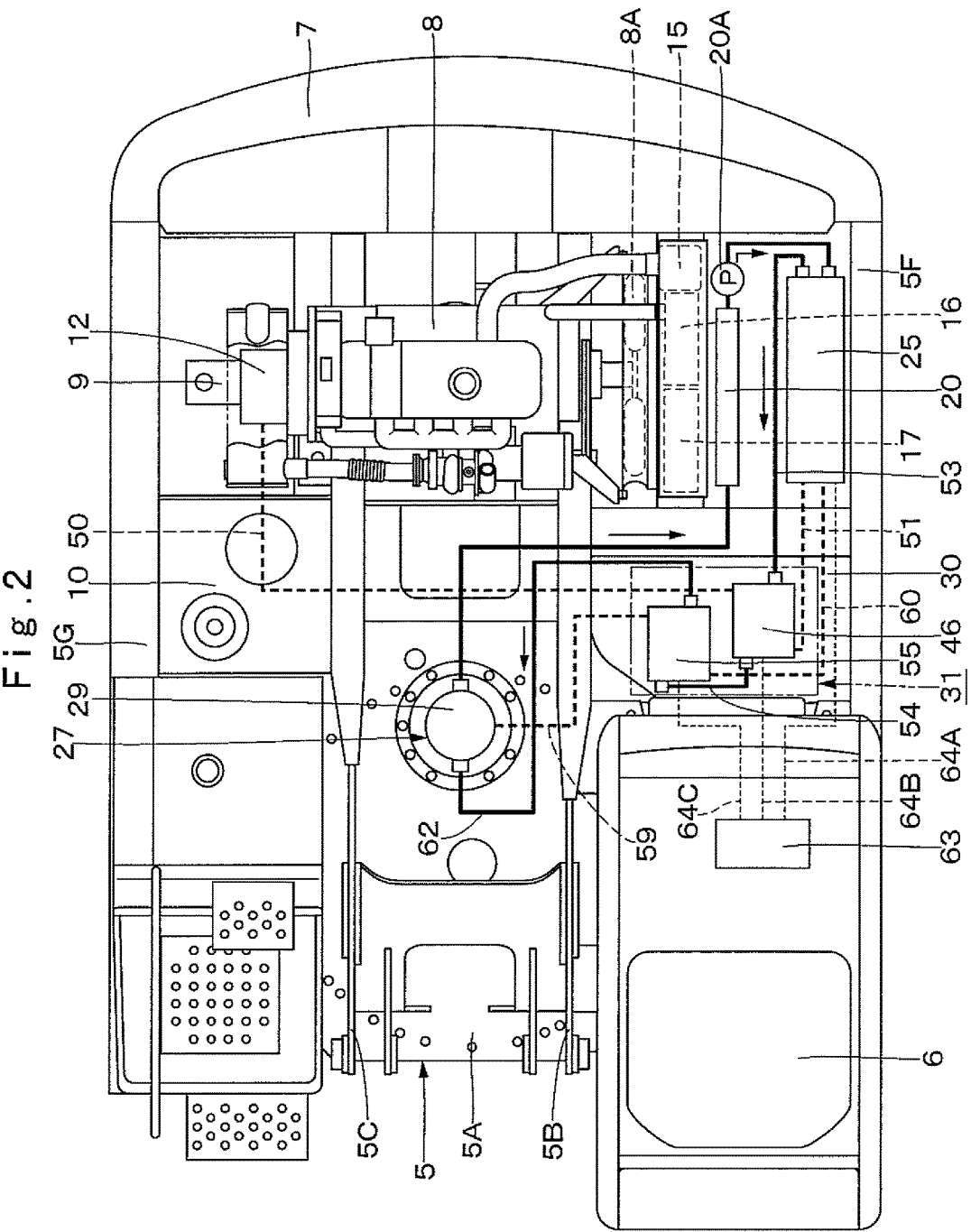
FIG. 2 is a plan view showing an engine, an electricity storage device, an assist generator motor, a revolving electric motor, a first inverter, a second inverter and the like mounted on a revolving frame, together with a simplified cooling system and electrical system.

Further, as shown in FIG. 2 and FIG. 3, the radiator 20 for hybrid equipment is incorporated on the support frame 14 to cool cooling water for hybrid equipment as a cooling medium for hybrid equipment. The cooling water for hybrid equipment cools the electricity storage device 25, first and second inverters 46, 55 and a revolving electric motor 29, which configure the hybrid equipment to be described later. That is, as shown in an arrow in FIG. 2, the cooling water for hybrid equipment cooled by the radiator 20 for hybrid equipment is supplied to the electricity storage device 25 by a pump 20A and circulates into the radiator 20 for hybrid equipment via the first and second inverters 46, 55 and the revolving electric motor 29. It should be noted that the assist generator motor 12 is cooled by engine cooling water.

The heat exchanger 13 cools the cooling water for hybrid equipment, the compressed air, the engine cooling water, the hydraulic oil, the cooling medium for air conditioner, and the fuel respectively by supply of the outside air (cooling air F) sucked by the cooling fan 8A to the radiator 20 for hybrid equipment, the condenser 18 for air conditioner, the fuel cooler 19, the intercooler 15, the radiator 16 for engine and the oil cooler 17.

A housing cover 21 is positioned in the front side of the counterweight 7 and is provided on the revolving frame 5. The housing cover 21 covers the engine 8, the hydraulic pump 9, the assist generator motor 12, the heat exchanger 13 and the like. Here, as shown in FIG. 1, an upper side of the housing cover 21 comprises an upper surface plate 22 and an engine cover 22A. A left side of the housing cover 21 comprises a left front side door 23 disposed on the rear side of the cab 6 and the left rear side door 24 disposed between the left front side door 23 and the counterweight 7. The air inlet port 24A for sucking outside air as cooling air F is provided in the left rear side door 24.

The left front side door 23 opens/closes at the time of performing a maintenance work of the first and second inverters 46, 55 to be described later and the like. The left rear side door 24 opens/closes at the time of performing a maintenance work of the heat exchanger 13 and the like. On the other hand, aright side of the housing cover 21 comprises a right side door (not shown) disposed between the hydraulic oil tank 10 and the counterweight 7.

The electricity storage device 25 performs charge or discharge of power, and the electricity storage device 25 is disposed upstream side of the heat exchanger 13 in the flow direction of cooling air F supplied to the heat exchanger 13. The electricity storage device 25 comprises a lithium ion cell, for example, and is mounted on the revolving frame 5. The electricity storage device 25 stores power generated by the assist generator motor 12 and regeneration power generated by the revolving electric motor 29 to be described later by deceleration of a revolving operation (regeneration operation) of the upper revolving structure 3 or discharges (supplies) the stored power to the assist generator motor 12 and the revolving electric motor 29.

It should be noted that the electricity storage device 25 may use, for example, a capacitor of an electrical double layer other than the lithium ion cell. In a case of using the capacitor to the electricity storage device 25, it is preferable that a chopper (not shown) is provided between the electricity storage device 25 and cables 51, 60 (DC bus) for electricity storage device to be connected thereto and a voltage of the DC bus is kept to be constant by the chopper.

Figure 5:
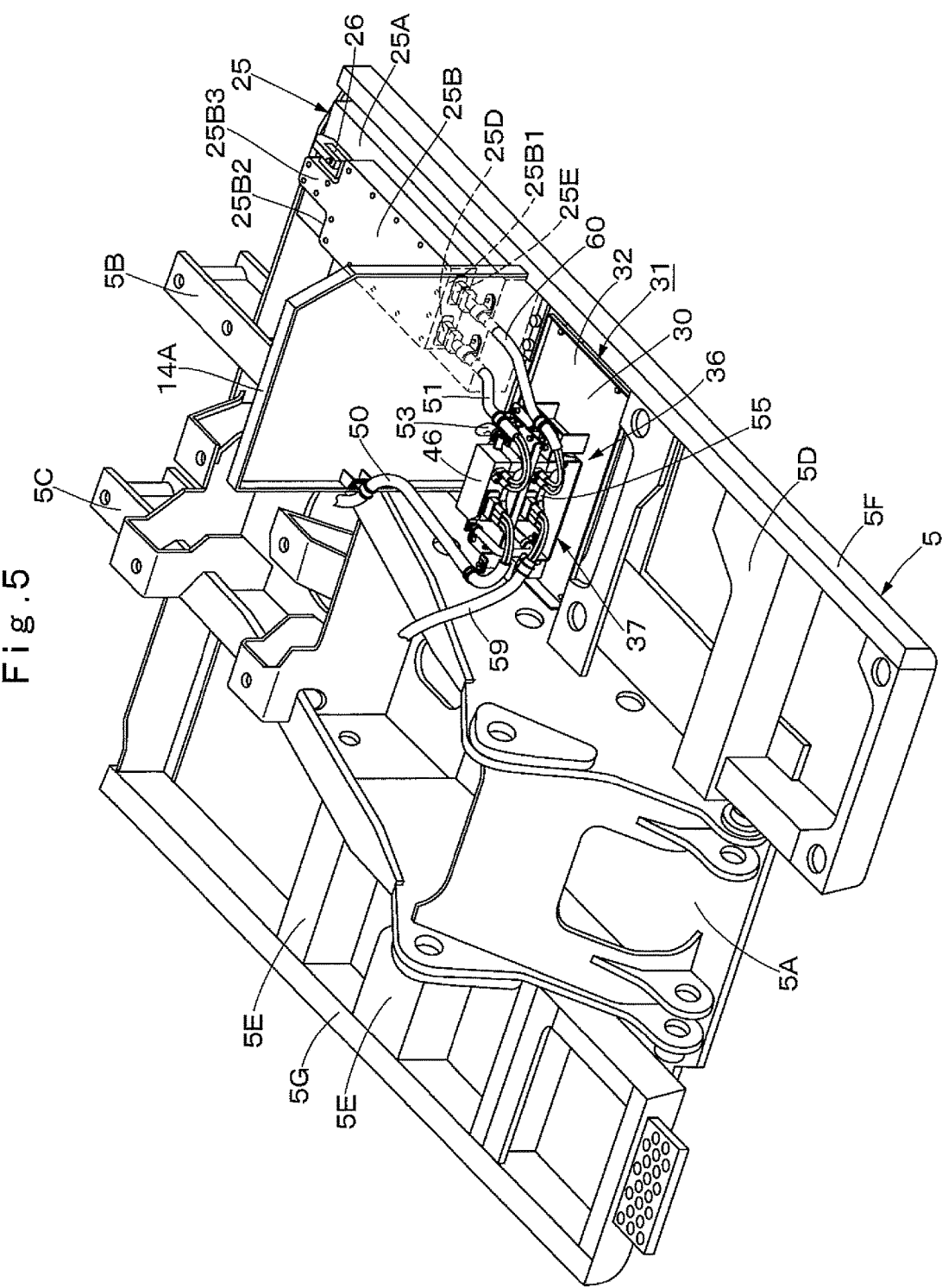

Here, as shown in FIG. 3 and FIG. 5, the electricity storage device 25 comprises a cubic casing 25A in which a plurality of battery modules are accommodated and a connecting box (junction box) 25B that is composed of a box smaller than the casing 25A and is mounted on the casing 25A. A water jacket (not shown) in which cooling water circulates is provided in the casing 25A.

Figure 10:
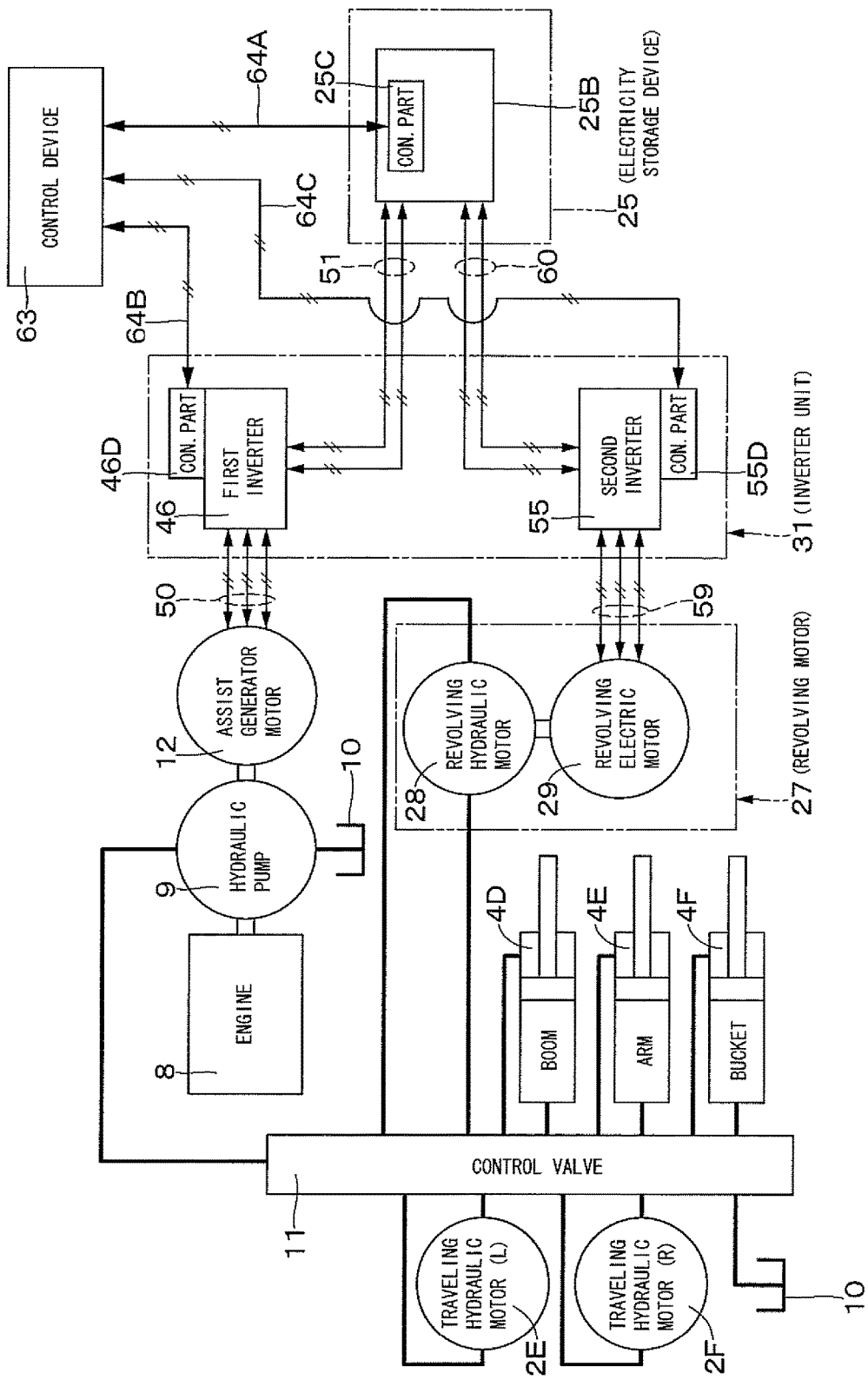
FIG. 10 is a block diagram showing a hydraulic system and an electrical system of the hydraulic excavator.

The connecting box 25B establishes connection between the cables 51, 60 for electricity storage device extending from the first and second inverters 46, 55 to be described later and a terminal of the electricity storage device 25. As shown in FIG. 3 and FIG. 10, an electrical circuit including a control part 25C for controlling charge/discharge of the electricity storage device 25 based upon signals (command signals) from a control device 63 to be described later is accommodated inside the connecting box 25B.

Here, a first cable connecting port 25D and a second cable connecting port 25E are provided on a front side surface 25B1 of the connecting box 25B to line up in the left-right direction. As described later, the cable 51 for electricity storage device for connection to the first inverter 46 is connected to the first cable connecting port 25D. The cable 60 for electricity storage device for connection to the second inverter 55 is connected to the second cable connecting port 25E.

In addition, an extension part 25B3 is provided on a rear side surface 25B2 of the connecting box 25B to be positioned in the intermediate part thereof in the left-right direction and extend backward. A disconnecting switch 26 is provided in the extension part 25B3 to establish or block power distribution between the electricity storage device 25 and the first and second inverters 46, 55. An operator or a serviceman operates the disconnecting switch 26, thus making it possible to manually stop power supply to the assist generator motor 12 or the revolving electric motor 29 to be described later from the electricity storage device 25 at the maintenance work, for example.

The revolving motor 27 is provided in the central part of the revolving frame 5. The revolving motor 27 revolves the upper revolving structure 3 to the lower traveling structure 2. Here, as shown in FIG. 10, the revolving motor 27 comprises the revolving hydraulic motor 28 driven by the pressurized oil supplied from the hydraulic pump 9 and the revolving electric motor 29, which will be described later, mounted on the revolving hydraulic motor 28.

The revolving electric motor 29 revolves the upper revolving structure 3 on the lower traveling structure 2 in cooperation with the revolving hydraulic motor 28. The revolving electric motor 29 configures a second electric motor according to the present invention. The water jacket in which cooling water circulates is formed in the casing as an outer shell of the revolving electric motor 29 (any thereof is not shown). Here, the revolving electric motor 29 is driven by supply of power stored in the electricity storage device 25 to revolve the upper revolving structure 3. Further, the revolving electric motor 29 generates regeneration power by a regeneration operation when the upper revolving structure 3 decelerates and supplies the regeneration power to the electricity storage device 25.

That is, the revolving electric motor 29 has a function of an electric motor that revolves the upper revolving structure 3 by supply of power from the electricity storage device 25 via the cable 59 for revolving electric motor to be described later, and a function of an electric generator that converts kinetic energy of the upper revolving structure 3 into electrical energy at the time of deceleration of a revolving the upper revolving structure 3. The regeneration power generated by the revolving electric motor 29 is supplied to the electricity storage device 25 via the cable 59 for revolving electric motor and stored in the electricity storage device 25.

As shown in FIG. 2 to FIG. 5, a utility room 30 is formed on the rear side of the cab 6. The utility room 30 is defined by a rear surface of the cab 6, the upper surface plate 22 and the left front side door 23 configuring the housing cover 21 and the front partition plate 14A configuring the support frame 14 of the heat exchanger 13. Here, a lower side of the utility room 30 is closed by a floor plate 32 to be described later, and an inverter assembly 36 to be described later is mounted on the floor plate 32.

Next, an explanation will be made of an inverter unit 31 disposed in the utility room 30.

As shown in FIG. 6 to FIG. 9, the inverter unit 31 is formed by integrally uniting the first inverter 46 and the second inverter 55 to be described later. The inverter unit 31 comprises the floor plate 32, the vibration isolating members 35 and the inverter assembly 36 to be described later.

Figure 4:
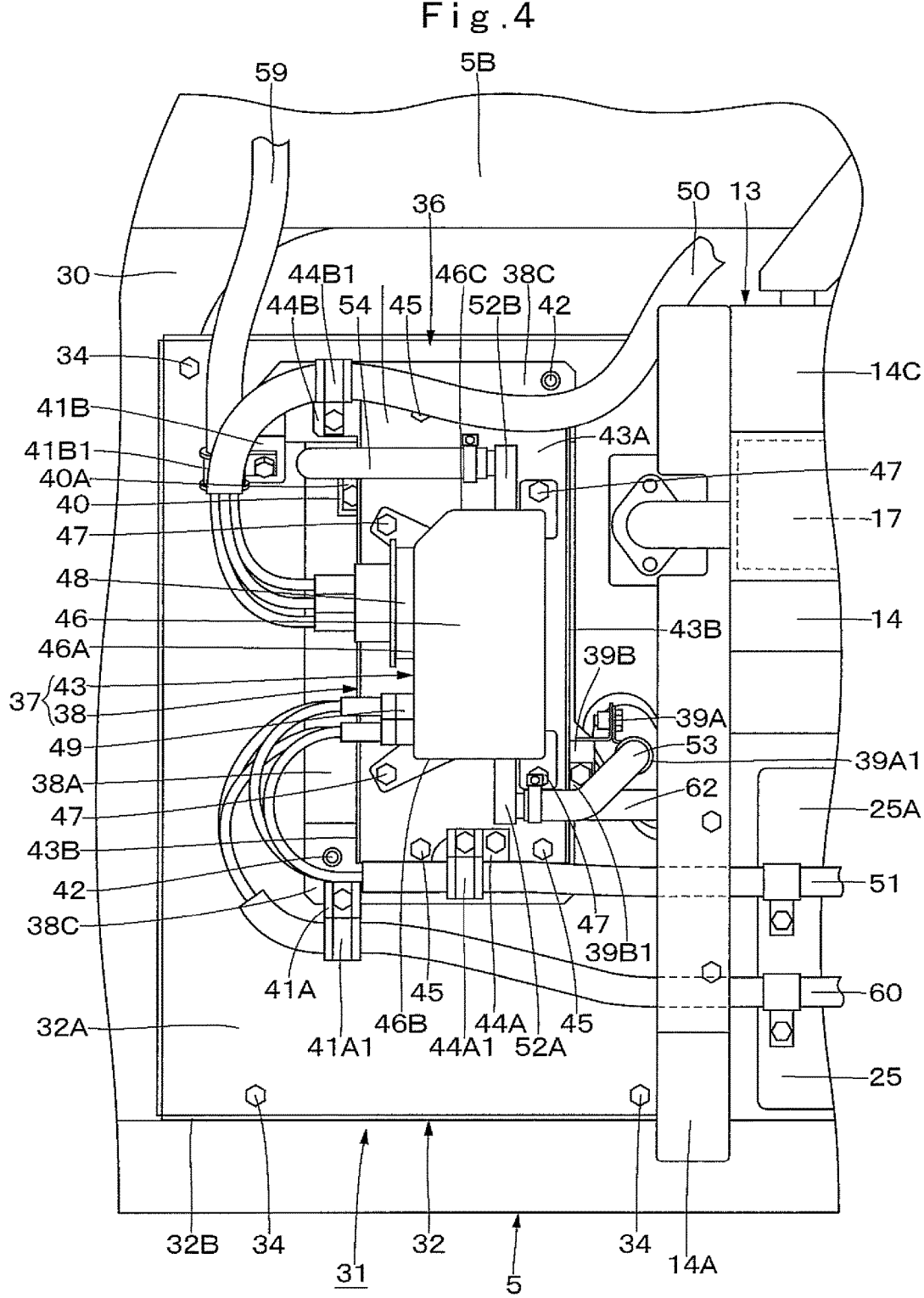
FIG. 4 is an enlarged plan view showing the inverter unit in FIG. 3 in an enlarging manner.

The floor plate 32 configures apart of the revolving frame 5, and closes the lower side of the utility room 30. The floor plate 32 becomes a base of the inverter unit 31. As shown in FIG. 4 and FIG. 5, the floor plate 32 is formed in a rectangular tray shape as a whole by a bottom plate part 32A closing the lower side of the utility room 30 between a left vertical plate 5B and a left side frame 5F and an outer frame part 32B bent upward from an outer peripheral edge of the bottom plate part 32A. Four corner parts of the bottom plate part 32A are respectively provided with bolt through holes 32C. As shown in FIG. 4, it is configured such that the floor plate 32 is mounted on the revolving frame 5 by screwing bolts 34 inserted in the bolt through holes 32C into a bottom plate 5A or a floor plate mounting part (not shown) provided in the left side frame 5F.

Figure 6:
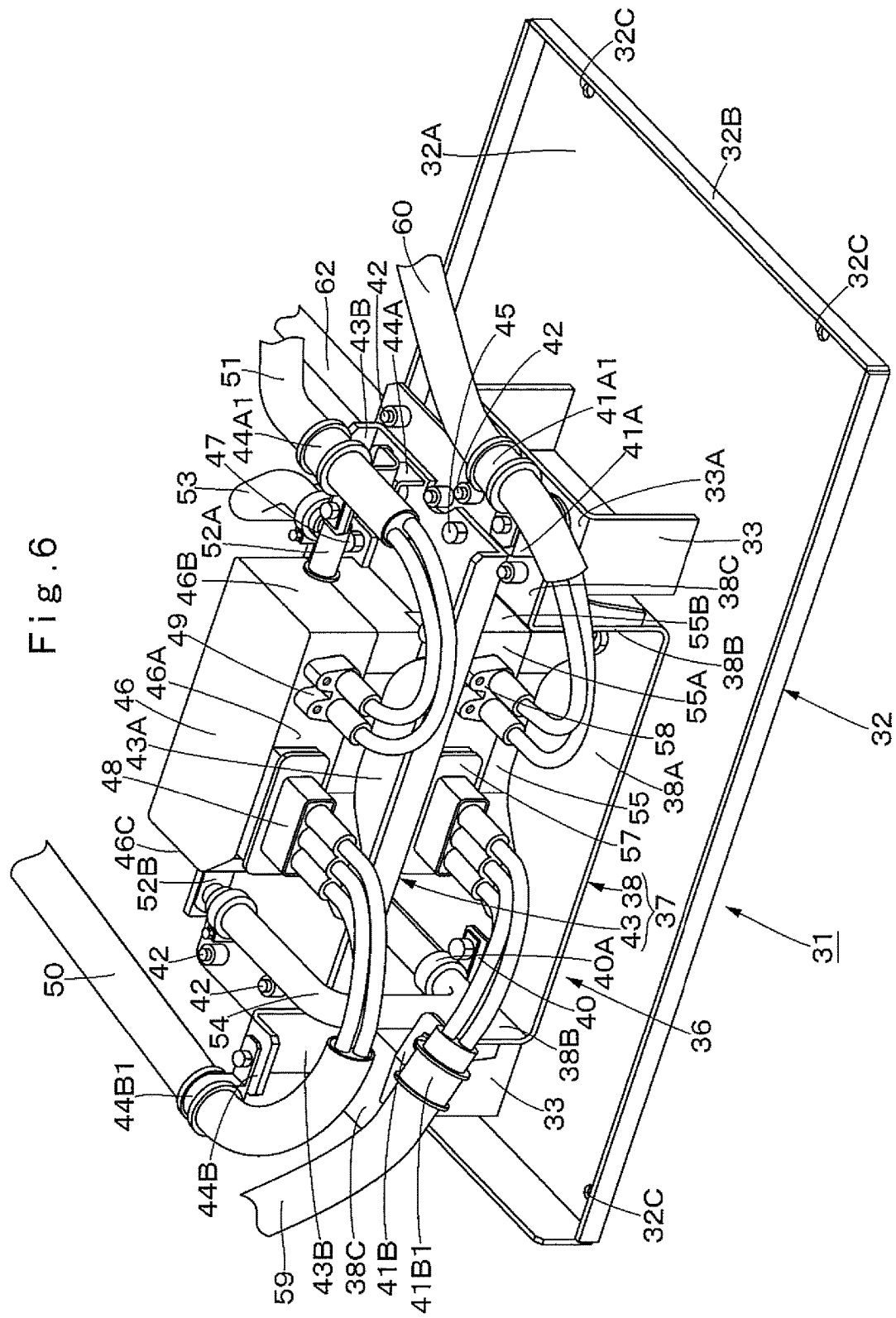
FIG. 6 is a perspective view showing a state where the inverter unit, cables and inlet lines are removed from the revolving frame in FIG. 5.
Figure 7:
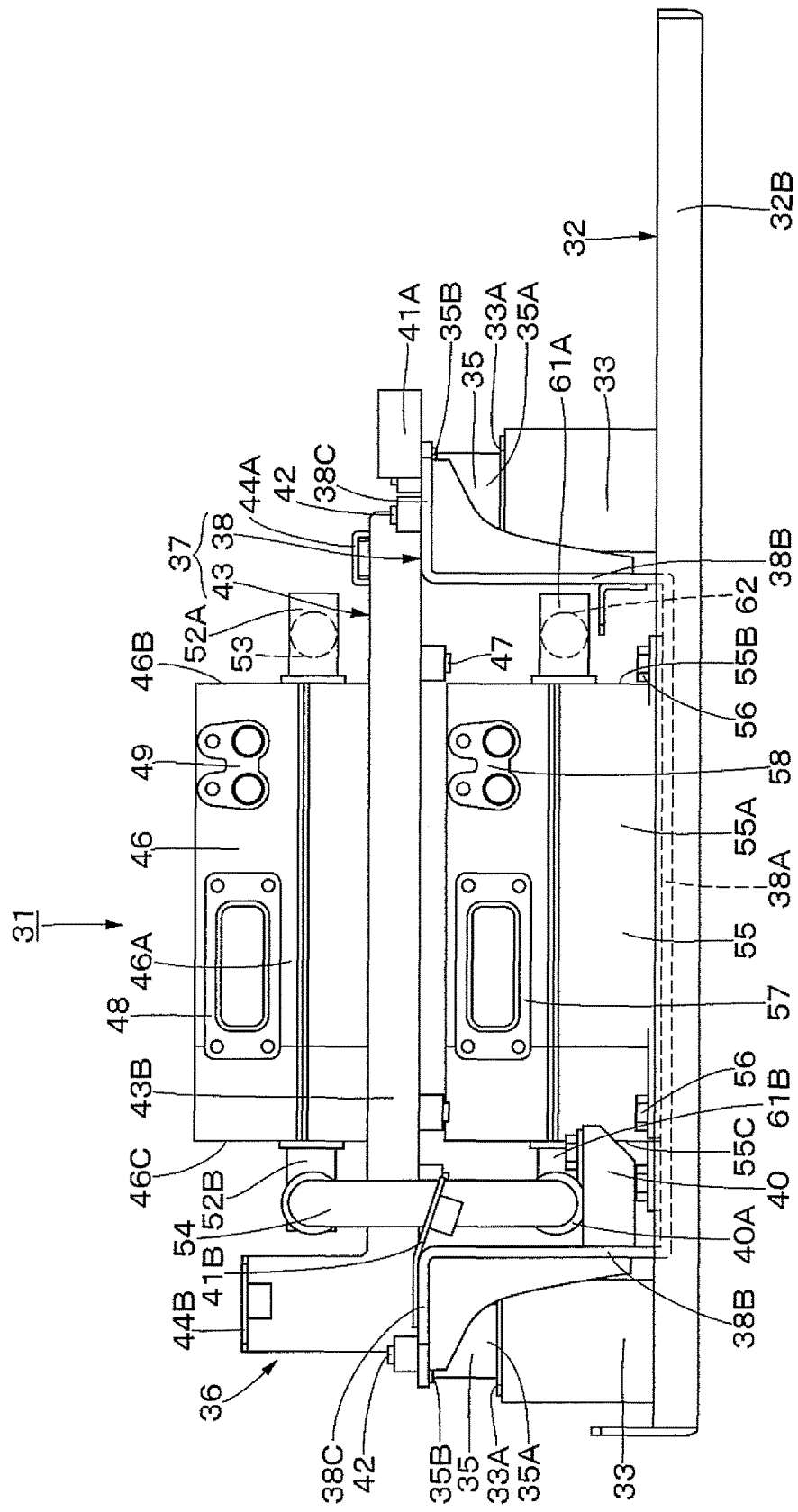
FIG. 7 is a front view showing the inverter unit.
Figure 8:
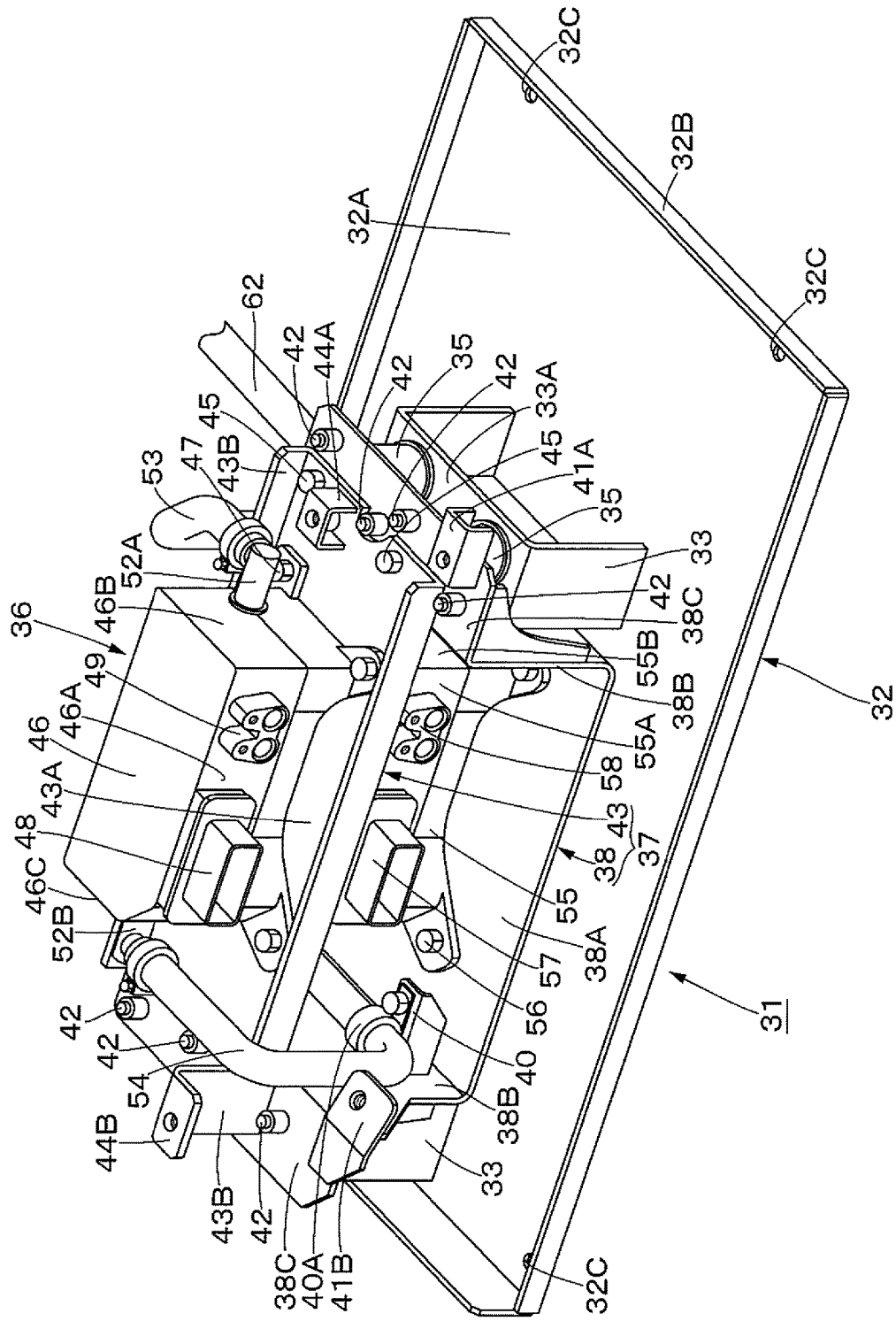
FIG. 8 is a perspective view showing the inverter unit.

As shown in FIG. 6 and FIG. 8, two platforms 33 are disposed to be spaced from each other in the left-right direction to rise upward from the bottom plate part 32A. The vibration isolating members 35 lining up in the front-rear direction are respectively disposed on an upper surface 33A of each of the platforms 33.

That is, the two vibration isolating members 35 are respectively disposed on the upper surface 33A of each of the platforms 33, and the respective vibration isolating members 35 are disposed on the upper surface 33A of each of the platforms 33 to be spaced from each other in the front-rear direction. Here, each of the vibration isolating members 35 elastically supports a support bracket 37 to be described later on the revolving frame 5 to suppress vibrations of the upper revolving structure 3 from directly transmitting to the first and second inverters 46, 55.

Each of the vibration isolating members 35 comprises an elastic body 35A that is formed by using a flexible material (elastic material) such as rubber and the like and is mounted on the upper surface 33A of the platform 33 and a support bracket mounting part 35B that is formed by using a plate material in a substantially elliptic shape and is mounted on an upper surface of the elastic body 35A. Bolt through holes 35B1 are provided in both end sides of each of the support bracket mounting parts 35B in the front-rear direction, and bolts 42 for mounting the inverter assembly 36 to be described later on the vibration isolating members 35 are inserted in the bolt through holes 35B1.

Next, an explanation will be made of the inverter assembly 36 including the support bracket 37, the first inverter 46 and the second inverter 55.

That is, the inverter assembly 36 is elastically supported on the vibration isolating members 35. The inverter assembly 36 comprises the support bracket 37, the first inverter 46, the second inverter 55, a connecting line 54 and the like, which will be described later, and is formed by sub-assembling them as one assembly. In this way, the first inverter 46 and the second inverter 55 are sub-assembled by using the support bracket 37. Thereby, it is possible to improve the assembling performance of the first and second inverters 46, 55. Since it is possible to support the first and second inverters 46, 55 on the common vibration isolating members 35, the cost can be reduced.

First, an explanation will be made of the support bracket 37 for supporting the first inverter 46 and the second inverter 55.

The support bracket 37 is mounted on the vibration isolating members 35, and the support bracket 37 supports the first inverter 46 and the second inverter 55 together. Therefore, the first inverter 46 and the second inverter 55 are elastically supported together on the vehicle body (revolving frame 5) by using the support bracket 37. That is, as shown in FIG. 6 to FIG. 9, the support bracket 37 supports the first inverter 46 and the second inverter 55 to line up in the upper-lower direction. Therefore, the support bracket 37 comprises a lower side mounting member 38 and an upper side mounting member 43, which will be described later.

The lower side mounting member 38 is positioned in the lower side in the upper-lower direction to mount the second inverter 55 to be described later. The lower side mounting member 38 is positioned between the platforms 33 disposed on the bottom plate part 32A of the floor plate 32 to be spaced from each other in the left-right direction, and comprises a flat plate 38A made up of a rectangular plate material, left and right rising plates 38B rising upward respectively from both ends of the flat plate 38A in the left-right direction, and left and right flange plates 38C extending outward (to the opposite side to the flat plate 38A) respectively from upper ends of the left and right rising plates 38B in the left-right direction.

The flat plate 38A has a length dimension in the front-rear direction that is set to be substantially equal to a length dimension in the front-rear direction of a pair of the platforms 33, and is in a position lower than the upper surface 33A of each of the platforms 33. The flat plate 38A is provided with four female holes (not shown), in which bolts 56 for mounting the second inverter 55 to be described later are screwed, by using back nuts, back screw seats and the like, for example.

An inlet line fixing projection piece 39A as a line fixing tool for fixing an inlet line 53 to be described later and an outlet line fixing projection piece 39B as a line fixing tool for fixing an outlet line 62 to be described later are provided on a rear end side of the flat plate 38A and in the left side as the other end in the left-right direction (refer to FIG. 4). The inlet line 53 is fixed to the inlet line fixing projection piece 39A by using a clamp 39A1. The outlet line 62 is fixed to the outlet line fixing projection piece 39B by using a clamp 39B1.

The left and right rising plates 38B facing each other in the left-right direction and a height dimension thereof is set to be greater than a height dimension of the second inverter 55 to be described later and slightly smaller than a height dimension from the bottom plate part 32A of the floor plate 32 to the upper surface of the support bracket mounting part 35B in the vibration isolating member 35. A connecting line fixing projection piece 40 on which a connecting line 54 to be described later is fixed is provided on a front end side of the rising plate 38B in the right side as one side in the left-right direction. The connecting line 54 is fixed to the connecting line fixing projection piece 40 through a clamp 40A.

Figure 9:
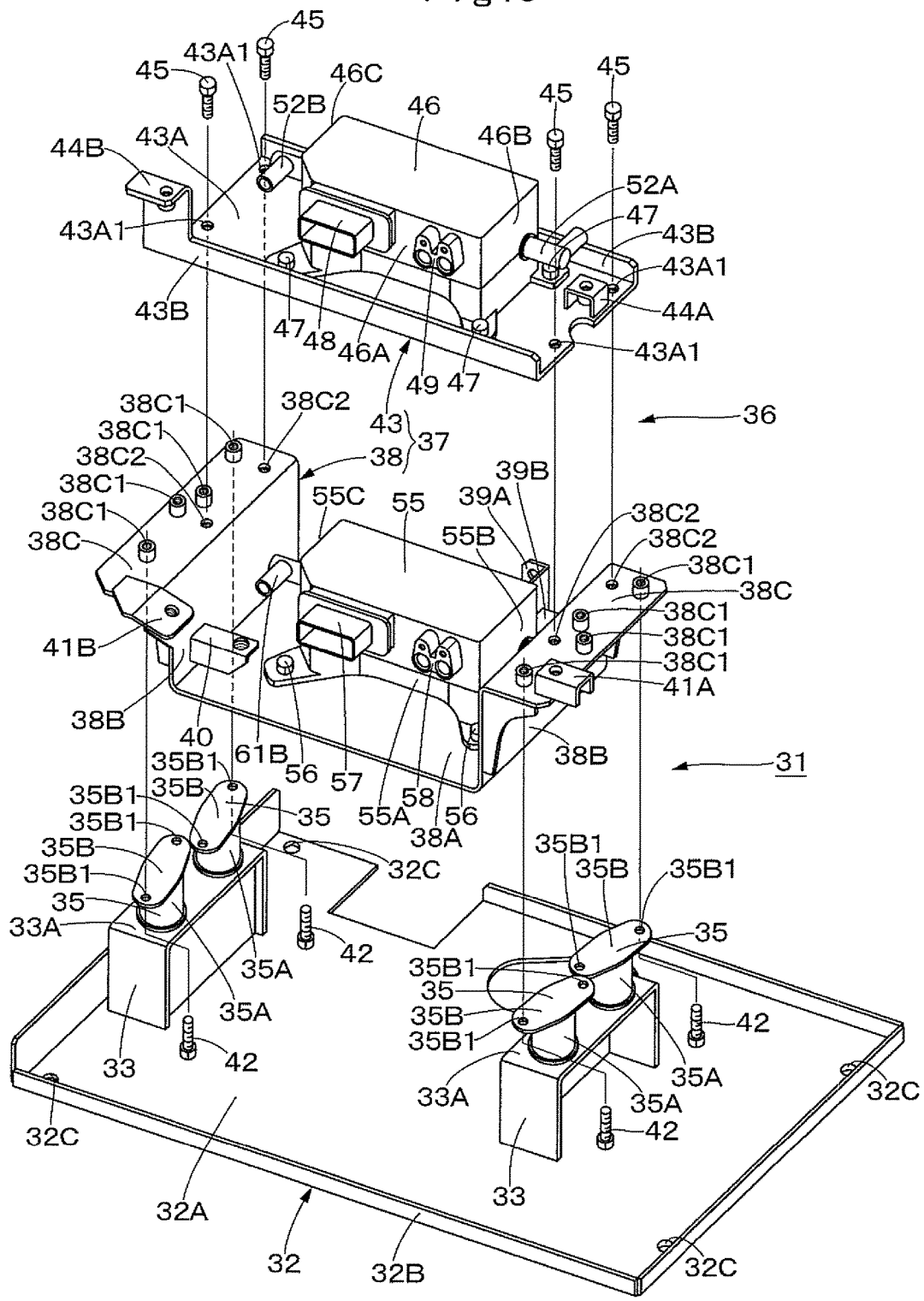
FIG. 9 is an exploded perspective view showing the inverter unit in FIG. 8.

As shown in FIG. 4 and FIG. 9, a cable fixing projection piece 41A for electricity storage device is formed in a reverse U-letter shape and is provided on a front end side of the left (other side) flange plate 38C, the cable fixing projection piece 41A acting as a cable fixing tool for fixing a cable 60 for electricity storage device to be described later. The cable 60 for electricity storage device is fixed to the cable fixing projection piece 41A for electricity storage device by a clamp 41A1. A cable fixing projection piece 41B for revolving electric motor is provided on a front end side of the right (one side) flange plate 38C, the cable fixing projection piece 41B being formed in a plate shape inclining obliquely downward from the flange plate 38C to the flat plate 38A and acting as a cable fixing tool for fixing a cable 59 for revolving electric motor to be described later. The cable 59 for revolving electric motor is fixed to the cable fixing projection piece 41B for revolving electric motor by a clamp 41B1.

The left and right flange plates 38C each are provided with four female screw holes 38C1 in the front-rear direction. The female screw holes 38C1 are disposed in positions corresponding to the bolt through holes 35B1 provided in the support bracket mounting part 35B of each of the vibration isolating members 35. The female screw holes 38C1 are formed on an upper surface side of the flange plate 38C by using front nuts, front screw seats and the like, for example. Two female screw holes 38C2 are formed in each of the left and right flange plates 38C to be spaced from each other in the front-rear direction, the two female screw holes 38C2 being provided in positions different from those of the female screw holes 38C1 respectively and closer to the inward side in the left-right direction than the female screw holes 38C1 (closer to the rising plate 38B). Bolts 45 are screwed into the respective female screw holes 38C2 to mount an upper side mounting member 43 to be described later. Here, the respective female screw holes 38C2 are formed on a lower surface side of the flange plate 38C by using back nuts, back screw seats and the like, for example.

A lower side mounting member 38 is mounted on the four vibration isolating members 35. Therefore, the lower side mounting member 38 has the left and right flange plates 38C that are placed respectively on the support bracket mounting parts 35B of the left and right vibration isolating members 35. In this state, the two bolts 42 are inserted into the respective bolt through holes 35B1 respectively from a lower surface side of each of the support bracket mounting parts 35B, and each of the bolts 42 is screwed into each of the female screw holes 38C1 of the lower side mounting member 38.

In this case, a height dimension of each of the left and right rising plates 38B is set to be slightly smaller than a height dimension from the bottom plate part 32A of the floor plate 32 to an upper surface of the support bracket mounting part 35B of the vibration isolating member 35. Therefore, the flat plate 38A is in a non-contact state with the bottom plate part 32A, that is, in a state of being lifted by the vibration isolating members 35 (in a state of being separated from the bottom plate part 32A in the upper-lower direction). Therefore, the lower side mounting member 38 is elastically supported to the revolving frame 5 by the vibration isolating members 35.

The upper side mounting member 43 is positioned in the upper side from the lower side mounting member 38 and mounts the first inverter 46 to be described later thereon. The upper side mounting member 43 comprises a flat plate 43A extending between the left and right flange plates 38C of the lower side mounting member 38 and front and rear protrusion plates 43B protruding upward from both ends of the flat plate 43A in the front-rear direction.

A length dimension of the flat plate 43A in the left-right direction is set to be slightly greater than a length dimension between the left and right rising plates 38B of the lower side mounting member 38. The flat plate 43A is provided with four female screw holes (not shown) into which bolts 47 for mounting the first inverter 46 to be described later are screwed, the four female screw holes being formed by using back nuts, back screw seats and the like. Bolt through holes 43A1 are respectively provided on both end sides of the flat plate 43A in the left-right direction in positions corresponding to the respective female screw holes 38C2 formed in the left and right flange plates 38C of the lower side mounting member 38.

A cable fixing projection piece 44A for electricity storage device formed in a reverse U-letter shape is provided on the left end side (other end side) of the flat plate 43A and between the front and rear Bolt through holes 43A1. The cable fixing projection piece 44A for electricity storage device configures a cable fixing tool for fixing a cable 51 for electricity storage device to be described later. As shown in FIG. 4 and FIG. 6, the cable 51 for electricity storage device is fixed to the cable fixing projection piece 44A for electricity storage device by using a clamp 44A1.

A cable fixing projection piece 44B for assist generator motor is provided on the right end side (one end side) of the front protrusion plate 43B, the cable fixing projection piece 44B for assist generator motor protruding upward from the protrusion plate 43B and being formed in a reverse L-letter shape by bending the upper end thereof forward. The cable fixing projection piece 44B for assist generator motor is configured as a cable fixing tool for fixing a cable 50 for assist generator motor to be described later. As shown in FIG. 4 and FIG. 6, the cable 50 for assist generator motor is fixed to the cable fixing projection piece 44B for assist generator motor by using a clamp 44B1.

The upper side mounting member 43 is mounted on the lower side mounting member 38 by inserting the respective bolts 45 into the respective Bolt through holes 43A1 from an upper surface side of the flat plate 43A to be screwed into the respective female screw holes 38C2 of the left and right flange plates 38C in a state where the flat plate 43A is placed on the left and right flange plates 38C of the lower side mounting member 38. In this case, the upper side mounting member 43 is elastically supported to the respective vibration isolating members 35 through the lower side mounting member 38.

Next, an explanation will be made of the first inverter 46 and the second inverter 55 configuring the inverter unit 31.

The first inverter 46 is mounted on the flat plate 43A of the upper side mounting member 43. The first inverter 46 controls an operation of the assist generator motor 12. The first inverter 46 is mounted on the flat plate 43A of the upper side mounting member 43 by screwing the bolts 47 into female screw holes (not shown) formed in the flat plate 43A of the upper side mounting member 43.

A first cable connecting port 48 and a second cable connecting port 49 lining up in the left-right direction are provided on a front surface 46A side of a casing as an outer shell of the first inverter 46. The cable 50 (three-phase AC cable) for assist generator motor is removably mounted on the first cable connecting port 48 positioned in the right side as one side in the left-right direction for connection between the assist generator motor 12 and the first inverter 46.

As shown in FIG. 6, a halfway portion of the cable 50 for assist generator motor is fixed to the cable fixing projection piece 44B for assist generator motor provided on the upper side mounting member 43 through the clamp 44B1. Therefore, the cable 50 for assist generator motor is in the same vibration system with the support bracket 37, and vibrates together with the first inverter 46 fixed on the support bracket 37. Therefore, the cable 50 for assist generator motor is less subjected to a force of pulling (removing) it out of the first cable connecting port 48. Accordingly, the cable 50 for assist generator motor is prevented from pulling and falling down out of the first cable connecting port 48.

On the other hand, the cable 51 (DC bus) for electricity storage device is removably mounted on the second cable connecting port 49 positioned in the left side as the other side in the left-right direction for connection between the electricity storage device 25 and the first inverter 46. That is, the cable 51 for electricity storage device has one end side mounted on the first cable connecting port 25D provided in the connecting box 25B in the electricity storage device 25 and the other end side mounted on the second cable connecting port 49 of the first inverter 46.

A halfway portion of the cable 51 for electricity storage device is fixed to the cable fixing projection piece 44A for electricity storage device provided on the upper side mounting member 43 by using the clamp 44A1. Accordingly, the cable 51 for electricity storage device is in the same vibration system with the first inverter 46 and is prevented from pulling and falling down out of the second cable connecting port 49.

At the power generating of the assist generator motor 12, the first inverter 46 converts the power generated by the assist generator motor 12 into DC power, and supplies the DC power to the electricity storage device 25 through the cable 51 for electricity storage device. On the other hand, at the time of driving the assist generator motor 12 as an electric motor, the first inverter 46 converts the DC power supplied from the electricity storage device 25 via the cable 51 for electricity storage device into three-phase AC power, and supplies the three-phase AC power to the assist generator motor 12 via the cable 50 for assist generator motor.

As shown in FIG. 4 and FIG. 6, a cooling line connector 52A is provided on a left surface 46B side of the casing in the first inverter 46, and an inlet line 53 is connected to the cooling line connector 52A. That is, a downstream end side of the inlet line 53 for inflow of the cooling water for hybrid equipment flowing out from the electricity storage device 25 into the casing of the first inverter 46 is mounted on the cooling line connector 52A.

It should be noted that the inlet line 53 is provided for connection between the electricity storage device 25 and the first inverter 46 so that circulation of the cooling water for hybrid equipment therebetween is made possible, and an upstream end side of the inlet line 53 is connected to the electricity storage device 25. A halfway portion of the inlet line 53 is fixed to the inlet line fixing projection piece 39A provided on the lower side mounting member 38 by using the clamp 39A1. Accordingly, the inlet line 53 is in the same vibration system with the first inverter 46 and is prevented from pulling and falling down out of the cooling line connector 52A.

On the other hand, a cooling line connector 52B is provided on a right surface 46C side of the casing in the first inverter 46, and the connecting line 54 is connected to the cooling line connector 52B. That is, an upstream end side of the connecting line 54 for causing the cooling water for hybrid equipment flowing out from the first inverter 46 to flow toward the second inverter 55 is mounted on the cooling line connector 52B. A halfway portion of the connecting line 54 is fixed to the connecting line fixing projection piece 40 provided on the lower side mounting member 38 by using the clamp 40A. The connecting line 54 is provided for connection between the first inverter 46 and the second inverter 55 so that circulation of the cooling water for hybrid equipment therebetween is made possible.

A plurality of switching elements composed of a transistor, an insulating gate bipolar transistor (IGBT) and the like are accommodated in the casing of the first inverter 46. An on/off operation of each of the switching elements is controlled by a control part 46D. A signal line 64B to be described later for connection to a control device 63 to be described later is connected to the control part 46D. A water jacket (not shown) in which cooling water for hybrid equipment circulates is formed in the casing of the first inverter 46. The water jacket is connected to the inlet line 53 through the cooling line connector 52A, and is connected to the connecting line 54 through the cooling line connector 52B.

The second inverter 55 is mounted on the flat plate 38A of the lower side mounting member 38. The second inverter 55 controls an operation of the revolving electric motor 29. The second inverter 55 is mounted by screwing the bolts 56 into female screw holes (not shown) formed in the flat plate 38A of the lower side mounting member 38. In this case, the second inverter 55 is positioned right under the first inverter 46.

Here, the second inverter 55 is an inverter that is composed of components in common with those of the first inverter 46 and has an identical configuration to the first inverter 46. In this case, the identical configuration does not indicate the completely identical configuration only, but includes the concept that a basic configuration thereof is identical. That is, the identical configuration indicates the extent that when a configuration of the first inverter 46 is compared with a configuration of the second inverter 55, even if a slight difference exists therebetween, it does not make any problem upon using the first inverter 46 and the second inverter 55 as common components, for example.

As shown in FIG. 6, a first cable connecting port 57 and a second cable connecting port 58 lining up in the left-right direction are provided on a front surface 55A side of a casing as an outer shell of the second inverter 55. The cable 59 (three-phase AC cable) for revolving electric motor is removably mounted on the first cable connecting port 57 positioned in the right side as one side in the left-right direction for connection between the revolving electric motor 29 and the second inverter 55.

A halfway portion of the cable 59 for revolving electric motor is fixed to the cable fixing projection piece 41B for revolving electric motor provided on the lower side mounting member 38 by using the clamp 41B1. Thereby, the cable 59 for revolving electric motor is in the same vibration system with the second inverter 55. Therefore, the cable 59 for revolving electric motor is prevented from pulling and falling down out of the first cable connecting port 57.

On the other hand, the cable 60 (DC bus) for electricity storage device is removably mounted on the second cable connecting port 58 positioned in the left side as the other side in the left-right direction for connection between the electricity storage device 25 and the second inverter 55. That is, the cable 60 for electricity storage device has one end side mounted on the second cable connecting port 25E provided in the connecting box 25B in the electricity storage device 25 and the other end side mounted on the second cable connecting port 58 of the second inverter 55.

A halfway portion of the cable 60 for electricity storage device is fixed to the cable fixing projection piece 41A for electricity storage device provided on the lower side mounting member 38 by using the clamp 41A1. Accordingly, the cable 60 for electricity storage device is in the same vibration system with the second inverter 55 and is prevented from pulling and falling down out of the second cable connecting port 58.

At the power generating of the revolving electric motor 29, the second inverter 55 converts the power (regeneration power) generated by the revolving electric motor 29 into DC power, and supplies the DC power to the electricity storage device 25 through the cable 60 for electricity storage device. On the other hand, at the time of driving the revolving electric motor 29 as an electric motor, the second inverter 55 converts the DC power supplied from the electricity storage device 25 via the cable 60 for electricity storage device into three-phase AC power, and supplies the three-phase AC power to the revolving electric motor 29 via the cable 59 for revolving electric motor.

A cooling line connector 61A is provided on a left surface 55B side of the casing in the second inverter 55, and the outlet line 62 is connected to the cooling line connector 61A. That is, an upstream end side of the outlet line 62 for guiding the cooling water for hybrid equipment flowing out from the second inverter 55 toward the revolving electric motor 29 is mounted on the cooling line connector 61A. A halfway portion of the outlet line 62 is fixed to an outlet line fixing projection piece 39B provided on the lower side mounting member 38 by using a clamp 39B1. Accordingly, the outlet line 62 is in the same vibration system with the second inverter 55 and is prevented from pulling and falling down out of the cooling line connector 61A.

On the other hand, a cooling line connector 61B is provided on a right surface 55C side of the casing in the second inverter 55, and the connecting line 54 is connected to the cooling line connector 61B. That is, a downstream end side of the connecting line 54 for causing the cooling water for hybrid equipment flowing out from the first inverter 46 to flow toward the second inverter 55 is mounted on the cooling line connector 61B.

A plurality of switching elements composed of a transistor, an insulating gate bipolar transistor (IGBT) and the like are accommodated in the casing of the second inverter 55. An on/off operation of each of the switching elements is controlled by a control part 55D. A signal line 64C to be described later for connection to a control device 63 to be described later is connected to the control part 55D. A water jacket (not shown) in which cooling water for hybrid equipment circulates is formed in the casing of the second inverter 55. The water jacket is connected to the outlet line 62 through the cooling line connector 61A, and is connected to the connecting line 54 through the cooling line connector 61B.

As shown in FIG. 10, the control device 63 controls operations of the electricity storage device 25, the assist generator motor 12, the revolving electric motor 29 and the like. The control device 63 and the control part 25C of the electricity storage device 25 are connected through a signal line 64A. The control device 63 and the control part 46D of the first inverter 46 are connected through a signal line 64B. The control device 63 and the control part 55D of the second inverter 55 are connected through a signal line 64C.

The control device 63 controls the charge or discharge by the electricity storage device 25 by outputting a control signal to the control part 25C of the electricity storage device 25. In addition thereto, the control device 63 outputs control signals to the control parts 46D, 55D of the first and second inverters 46, 55 to control operations of the assist generator motor 12 and the revolving electric motor 29.

The hybrid-type hydraulic excavator 1 according to the present embodiment has the configuration as described above, and next, an explanation will be made of an operation thereof.

When an operator who have got on the cab 6 operates the engine 8, the hydraulic pump 9 and the assist generator motor 12 are driven by the engine 8. As a result, the pressurized oil delivered from the hydraulic pump 9 is supplied to the left and right traveling hydraulic motors 2E, 2F, the revolving hydraulic motor 28, and the boom cylinder 4D, the arm cylinder 4E and the bucket cylinder 4F in the working mechanism 4 in response to operations of an operation lever (not shown) provided in the cab 6. Thereby, the hydraulic excavator 1 performs a traveling operation by the lower traveling structure 2, a revolving operation by the upper revolving structure 3, an excavating operation by the working mechanism 4 and the like.

Here, when output torque of the engine 8 is greater than drive torque of the hydraulic pump 9 at the operating of the hydraulic excavator 1, the assist generator motor 12 is driven as an electric generator by the extra toque. Therefore, the assist generator motor 12 generates AC power. The AC power is converted into DC power by the first inverter 46, which is then stored in the electricity storage device 25. On the other hand, when the output torque of the engine 8 is smaller than the drive torque of the hydraulic pump 9, the assist generator motor 12 is driven as an electric motor by the power from the electricity storage device 25 to assist in a drive of the hydraulic pump 9 by the engine 8.

The revolving electric motor 29 is driven by supply of the power stored in the electricity storage device 25 to revolve the upper revolving structure 3 on the lower traveling structure 2 in cooperation with the revolving hydraulic motor 28. The revolving electric motor 29 generates AC power (regeneration power) by a regeneration operation when the upper revolving structure 3 revolves and decelerates, and the AC power is converted into DC power by the second inverter 55, which is then stored in the electricity storage device 25.

In this way, since the assist generator motor 12, the revolving electric motor 29 and the like are driven at the operating of the hydraulic excavator 1, the first inverter 46 for controlling the assist generator motor 12 and the second inverter 55 for controlling the revolving electric motor 29 generate heat to increase temperatures thereof. The electricity storage device 25 performs charge and discharge thereof according to operating situations of the hydraulic excavator 1 to generate heat and increase temperatures thereof.

In this case, the assist generator motor 12 is cooled by engine cooling water cooled by the radiator 16 for engine. On the other hand, the electricity storage device 25, the first inverter 46, the second inverter 55 and the revolving electric motor 29 are cooled by cooling water for hybrid equipment cooled by the radiator 20 for hybrid equipment.

Specifically, as shown in FIG. 2, the cooling water for hybrid equipment cooled by the radiator 20 for hybrid equipment is circulated in the order of the electricity storage device 25, the first inverter 46, the second inverter 55 and the revolving electric motor 29 by the pump 20A. That is, the cooling water for hybrid equipment having flowed out from the electricity storage device 25 flows into the first inverter 46 through the inlet line 53. The cooling water for hybrid equipment having flowed out from the first inverter 46 flows into the second inverter 55 through the connecting line 54. The cooling water for hybrid equipment having flowed out from the second inverter 55 flows into the revolving electric motor 29 through the outlet line 62. Thereby, the electricity storage device 25, the first inverter 46, the second inverter 55 and the revolving electric motor 29 are kept in an appropriate temperature.

Incidentally, in the hybrid-type working machine according to the conventional art as described above, the electricity storage device and the inverter are united to be configured as the electric unit. Therefore, when the electricity storage device or the inverter is replaced, both the electricity storage device and the inverter are required to be integrally removed from the vehicle body. In this case, since a plurality of cables, lines and the like are mounted to the electricity storage device and the inverter, the replacement works including the removal work of them become burdensome.

As a result, there is a problem that workability on the replacement work deteriorates.

Therefore, according to the first embodiment, it is configured such that the first inverter 46 and the second inverter 55 are mounted on the support bracket 37, which is elastically supported on the revolving frame 5 through the four vibration isolating members 35, in the position different from the position where the electricity storage device 25 is mounted. Specifically, the electricity storage device 25 is disposed in front of the counterweight 7 and in the front side (the left side in the left-right direction of the vehicle body) of the heat exchanger 13. On the other hand, the first inverter 46 and the second inverter 55 are disposed in the position separated from the electricity storage device 25, that is, in the utility room 30 positioned in front of the electricity storage device 25, in a state of being mounted on the support bracket 37. In this case, the first inverter 46 and the second inverter 55 are together supported to the revolving frame 5 by using the one support bracket 37.

Therefore, the first inverter 46 and the second inverter 55 are mounted compactly on the revolving frame 5. Along with this, it is possible to improve workability on the replacement work of the first and second inverters 46, 55 and the electricity storage device 25. In addition, since the support bracket 37 elastically supports the first and second inverters 46, 55 together on the revolving frame 5 through the four vibration isolating members 35, it is not necessary to provide the vibration isolating member to each of the first inverter 46 and the second inverter 55. Therefore, it is possible to improve the assembling performance of the first inverter 46 and the second inverter 55 and reduce the costs.

Further, the support bracket 37 is composed of the lower side mounting member 38 and the upper side mounting member 43 to be formed as an upper-lower layered structure, wherein the second inverter 55 is mounted on the lower side mounting member 38 and the first inverter 46 is mounted on the upper side mounting member 43. As a result, also in this respect, the first inverter 46 and the second inverter 55 can be mounted compactly on the revolving frame 5.

Next, an explanation will be made of the work of assembling the first inverter 46 and the second inverter 55 on the revolving frame 5.

First, the second inverter 55 is mounted on the flat plate 38A of the lower side mounting member 38 by the bolts 56. Next, the first inverter 46 is mounted on the flat plate 43A of the upper side mounting member 43 by the bolts 47. Then, the flat plate 43A of the upper side mounting member 43 is placed on the flange plates 38C of the lower side mounting member 38, and the bolts 45 are screwed into the female screw holes 38C2 of the lower side mounting member 38. Thereby, the lower side mounting member 38 and the upper side mounting member 43 are united.

Subsequently, the one end side (upstream end side) of the connecting line 54 is connected to the cooling line connector 52B of the first inverter 46, and the other end side (downstream end side) of the connecting line 54 is connected to the cooling line connector 61B of the second inverter 55. In this case, the halfway portion of the connecting line 54 is fixed to the connecting line fixing projection piece 40 of the lower side mounting member 38 by using the clamp 40A. As a result, the inverter assembly 36 is assembled as a subassembly.

The inverter assembly 36 thus assembled is mounted on the four vibration isolating members 35 provided on the platforms 33 of the floor plate 32 disposed in the utility room 30. That is, the flange plates 38C of the lower side mounting member 38 are placed on the vibration isolating members 35, and the respective bolts 42 are screwed respectively into the female screw holes 38C1 of the lower side mounting member 38. Therefore, the first inverter 46 and the second inverter 55 can be assembled on the revolving frame 5.

In this case, the flat plate 38A of the lower side mounting member 38 is positioned to be lower than a fulcrum point (mounting point or supporting point) between the lower side mounting member 38 and each of the vibration isolating members 35. Thereby, a gravity center height of the inverter assembly 36 can be lowered (low gravity center). More specifically, the gravity center height of the inverter assembly 36 can be substantially equal to the height position of the elastic body 35A of the vibration isolating member 35. As a result, it is possible to suppress a displacement of the inverter assembly 36 by vibrations of the upper revolving structure 3 (vehicle body), for example, a pivotal displacement (rotation displacement) due to a difference in the upper-lower direction between the fulcrum point (supporting point) and the gravity center of the inverter assembly 36.

The cable 50 for assist generator motor mounted on the first cable connecting port 48 of the first inverter 46 is fixed on the cable fixing projection piece 44B for assist generator motor of the upper side mounting member 43. The cable 51 for electricity storage device mounted on the second cable connecting port 49 is fixed on the cable fixing projection piece 44A for electricity storage device of the upper side mounting member 43. On the other hand, the cable 59 for revolving electric motor mounted on the first cable connecting port 57 of the second inverter 55 is fixed on the cable fixing projection piece 41B for revolving electric motor of the lower side mounting member 38. The cable 60 for electricity storage device mounted on the second cable connecting port 58 is fixed on the cable fixing projection piece 41A for electricity storage device.

Further, the inlet line 53 mounted on the cooling line connector 52A of the first inverter 46 is fixed on the inlet line fixing projection piece 39A of the lower side mounting member 38. On the other hand, the outlet line 62 mounted on the cooling line connector 61A of the second inverter 55 is fixed on the outlet line fixing projection piece 39B of the lower side mounting member 38. That is, various kinds of cables (power lines, signal lines and cooling hoses) connected to the first and second inverters 46, 55 are all fixed in the halfway portions on the support bracket 37. In addition, the connecting line 54 has an upstream side mounted on the cooling line connector 52B of the first inverter 46 and a downstream side mounted on the cooling line connector 61B of the second inverter 55. In this case, the connecting line 54 is fixed on the connecting line fixing projection piece 40 of the lower side mounting member 38.

Therefore, the respective cables 50, 51, 59, 60, the inlet line 53, the outlet line 62 and the connecting line 54 are in the same vibration system with the first and second inverters 46, 55. As a result, the respective cables 50, 51, 59, 60, the inlet line 53, the outlet line 62 and the connecting line 54 are prevented from pulling and falling down out of the first and second inverters 46, 55.

Thus, according to the first embodiment, the first inverter 46 and the second inverter 55 are mounted on the support bracket 37 in the position different from the position where the electricity storage device 25 is mounted. Therefore, the first inverter 46 and the second inverter 55 can be mounted compactly on the revolving frame 5 through the support bracket 37. Along with this, it is possible to improve workability on the replacement work of the first and second inverters 46, 55 and the electricity storage device 25.

The support bracket 37 can elastically support the first inverter 46 and second inverter 55 together on the revolving frame 5. Accordingly, it is not necessary to provide different vibration isolating members to the first inverter 46 and the second inverter 55 respectively. Therefore, it is possible to improve the assembling performance of the first inverter 46 and the second inverter 55 and reduce the costs.

The support bracket 37 is of the upper-lower layered structure, and thereby, the first inverter 46 and the second inverter 55 are mounted in a state of being layered (in parallel) in the upper-lower direction. Therefore, the first inverter 46 and the second inverter 55 can be mounted on the revolving frame 5 more compactly.

Since the support bracket 37, the first inverter 46, the second inverter 55 and the connecting line 54 are configured as the inverter assembly 36, it is possible to improve handling performance (easiness of handling) of these members. Thereby, it is possible to improve workability of the assembling work or removal work of the first inverter 46 and the second inverter 55 onto or from the revolving frame 5.

Further, the respective cables 50, 51, 59, 60, the inlet line 53, the outlet line 62 and the connecting line 54 are fixed on the support bracket 37. Accordingly, even if the support bracket 37 elastically supported on the revolving frame 5 vibrates, it is possible to reduce for an external force (force in a direction of removing them from the first inverter 46 or second inverter 55) to be applied to the respective cables 50, 51, 59, 60, the inlet line 53, the outlet line 62 and the connecting line 54. As a result, the respective cables 50, 51, 59, 60, the inlet line 53, the outlet line 62 and the connecting line 54 can be prevented from pulling and falling down out of the first and second inverters 46, 55 and reliability and stability of the hydraulic excavator 1 can be improved.

Figure 11:
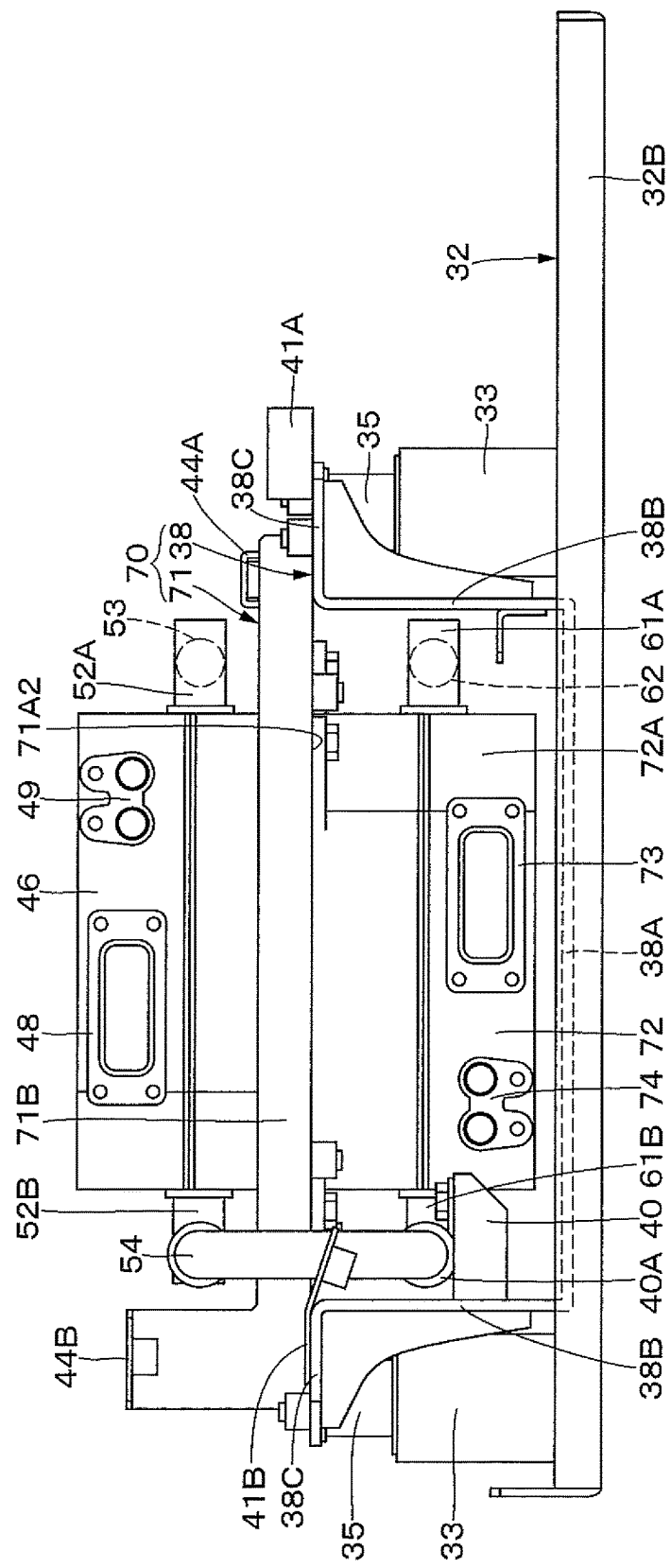
FIG. 11 is a front view showing an inverter unit according to a second embodiment as viewed in a position as similar to FIG. 7.
Figure 12:
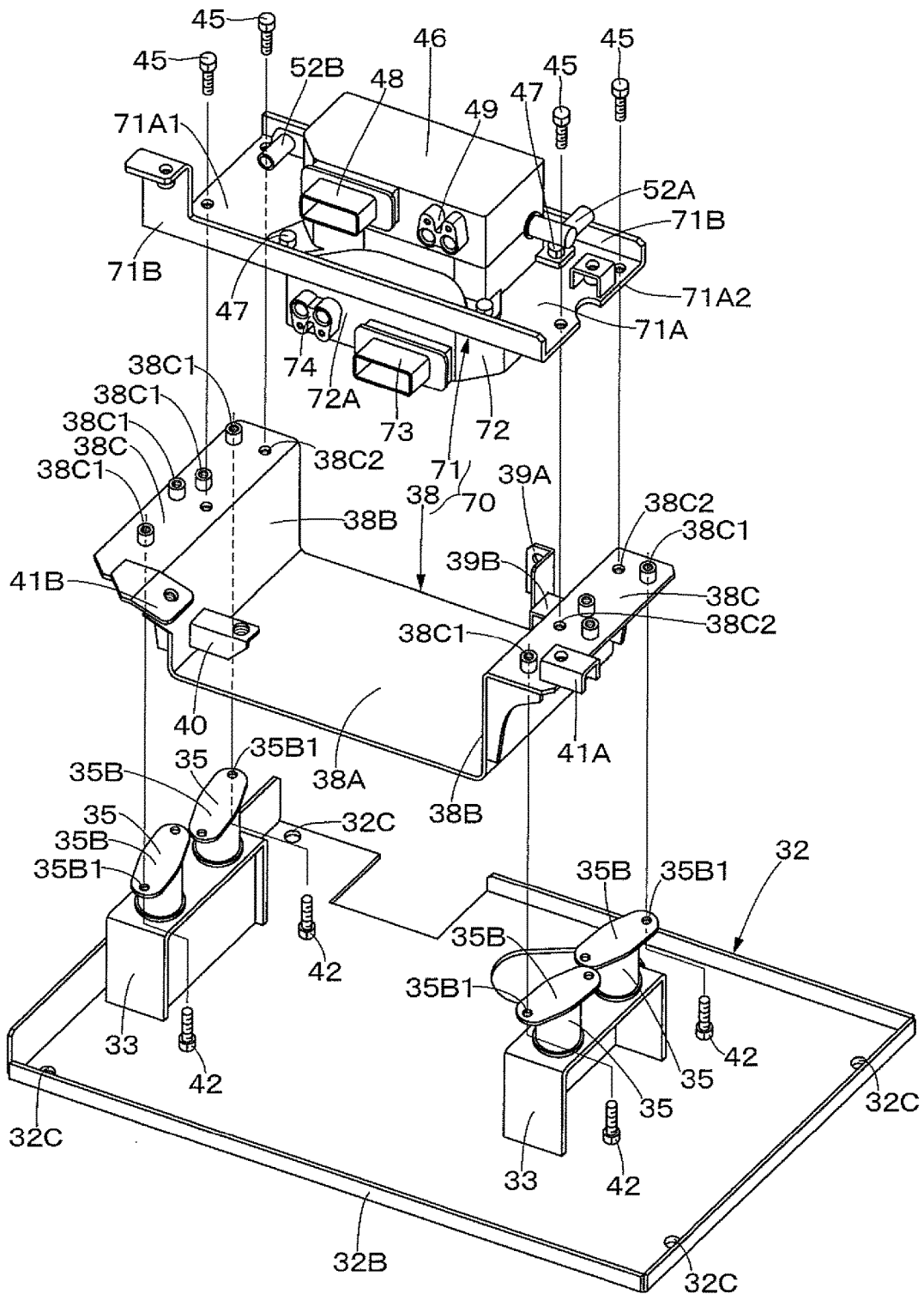
FIG. 12 is an exploded perspective view showing the inverter unit in FIG. 11.

Next, FIG. 11 and FIG. 12 show a second embodiment of the present invention. The present embodiment is characterized in that a first inverter is mounted on an upper surface side of an upper side mounting member and a second inverter is mounted on a lower surface side of the upper side mounting member. It should be noted that in the second embodiment, the component elements that are identical to those of the foregoing first embodiment will be simply denoted by the same reference numerals to avoid repetitions of similar explanations.

A support bracket 70 comprises an upper side mounting member 71 and the lower side mounting member 38 according to the first embodiment. The support bracket 70 is mounted on the vibration isolating members 35, and this support bracket 70 supports the first inverter 46 and a second inverter 72 together. Therefore, the first inverter 46 and the second inverter 72 are elastically supported to the vehicle body (revolving frame 5) together by using the support bracket 70. It should be noted that the support bracket 70 may be composed of the upper side mounting member 71 only.

The upper side mounting member 71 is positioned in the upper side from the lower side mounting member 38. The upper side mounting member 71 corresponds to a mounting member of the present invention. That is, the first inverter 46 and the second inverter 72 to be described later are mounted on the upper side mounting member 71. The upper side mounting member 71 comprises a flat plate 71A extending between the left and right flange plates 38C of the lower side mounting member 38 and front and rear protrusion plates 71B protruding upward from both ends of the flat plate 71A in the front-rear direction.

The first inverter 46 is mounted on an upper surface 71A1 side of the flat plate 71A. On the other hand, the second inverter 72 to be described later is mounted on a lower surface 71A2 side of the flat plate 71A. The upper side mounting member 71 is mounted on the left and right flange plates 38C of the lower side mounting member 38 by the bolts 45.

The second inverter 72 is mounted on the upper side mounting member 71, and controls an operation of the revolving electric motor 29. The second inverter 72 is an inverter that is composed of components in common with those of the first inverter 46 and has an identical configuration to the first inverter 46. In this case, the identical configuration does not indicate the completely identical configuration only, but includes the concept that a basic configuration thereof is identical. That is, the identical configuration indicates the extent that when a configuration of the first inverter 46 is compared with a configuration of the second inverter 72, even if a slight difference exists therebetween, it does not make any problem upon using the first inverter 46 and the second inverter 72 as common components, for example.

The second inverter 72 is mounted on the lower surface 71A2 side of the flat plate 71A in the upper side mounting member 71 in a state of being reversed to the first inverter 46 in the upper-lower direction. A first cable connecting port 73 and a second cable connecting port 74 lining up in the left-right direction are provided on a front surface 72A side of a casing as an outer shell of the second inverter 72 (refer to FIG. 11).

The cable 59 (three-phase AC cable) for revolving electric motor is removably mounted on the first cable connecting port 73 positioned in the left side (other side) in the left-right direction for connection between the revolving electric motor 29 and the second inverter 72. On the other hand, the cable 60 (DC bus) for electricity storage device is removably mounted on the second cable connecting port 74 positioned in the right side (one side) in the left-right direction for connection between the electricity storage device 25 and the second inverter 72.

In this case, for example, even when a gravity center position of each of the first inverter 46 and second inverter 72 deviates in the left-right direction, this deviation can be cancelled out. That is, for example, even in a case where the gravity center position of the first inverter 46 is positioned closer to the first cable connecting port 48 and the gravity center position of the second inverter 72 is positioned closer to the first cable connecting port 73, since the second inverter 72 is mounted on the upper side mounting member 71 in a state of being reversed to the first inverter 46, a gravity center position of a total of the three members can be made to a substantially central part of the upper side mounting member 71.

Further, since the upper side mounting member 71 is mounted horizontally on the flange plates 38C of the lower side mounting member 38, a height dimension of the gravity center position can be made to a height substantially equal to a height dimension of a mounting position of each of the left and right vibration isolating members 35. As a result, the first inverter 46 and the second inverter 72 can be stably mounted on the revolving frame 5.

Thus, also in the second embodiment as configured above, operational effects as substantially similar to those of the aforementioned first embodiment can be obtained. Particularly, in the second embodiment, the first inverter 46 and the second inverter 72 that are composed of the common components and are formed of the same configuration are mounted on the upper side mounting member 71 in a reversed state to each other in the upper-lower direction.

Accordingly, in a state where the first inverter 46 and the second inverter 72 are mounted on the upper side mounting member 71, the gravity center position of a total of the three members can be positioned to a substantially central part of the upper side mounting member 71. As a result, the first inverter 46 and the second inverter 72 can be stably mounted on the revolving frame 5.

It should be noted that the aforementioned first embodiment is explained by taking a case where the first inverter 46 is mounted on the upper side mounting member 43 and the second inverter 55 is mounted on the lower side mounting member 38, as an example. However, the present invention is not limited thereto, but, for example, the second inverter 55 may be mounted on the upper side mounting member 43, and the first inverter 46 may be mounted on the lower side mounting member 38.

The aforementioned second embodiment is explained by taking a case where the first inverter 46 is mounted on the upper surface 71A1 side of the upper side mounting member 71 and the second inverter 72 is mounted on the lower surface 71A2 side of the upper side mounting member 71, as an example. However, the present invention is not limited thereto, but, for example, the second inverter 72 may be mounted on the upper surface 71A1 side of the upper side mounting member 71 and the first inverter 46 may be mounted on the lower surface 71A2 side of the upper side mounting member 71.

The aforementioned second embodiment is explained by taking a case where the upper side mounting member 71 is mounted on the lower side mounting member 38, as an example. However, the present invention is not limited thereto, but, for example, the upper side mounting member 71 may be mounted directly on the left and right vibration isolating members 35 without using the lower side mounting member 38.

The aforementioned first embodiment is explained by taking a case where the revolving electric motor 29 is used as the second electric motor, as an example. However, the present invention is not limited thereto, but, for example, an electric motor for hydraulic regeneration that generates regeneration power by returning oil from a hydraulic actuator may be used as the second electric motor. The same applies to the second embodiment.

The aforementioned first embodiment is explained by taking a case where the revolving motor 27 comprises the revolving hydraulic motor 28 and the revolving electric motor 29, as an example. However, the present invention is not limited thereto, but, for example, the revolving motor may comprise the revolving electric motor only. The same applies to the second embodiment.

The aforementioned embodiments are explained by taking a case where the hydraulic excavator 1 of a crawler type equipped with the crawler belts 2D is used as the hydraulic-type working machine, as an example. However, the present invention is not limited thereto, but, for example, the present invention may be widely applied to various types of working machines such as a wheel-type hydraulic excavator equipped with wheels, a wheel loader, a fork lift and a dump truck and the like.

DESCRIPTION OF REFERENCE NUMERALS

1: Hydraulic excavator (Hybrid-type working machine)
2: Lower traveling structure (Vehicle body)
3: Upper revolving structure (Vehicle body)
4: Working mechanism
8: Engine
9: Hydraulic pump
12: Assist generator motor (First electric motor)
25: Electricity storage device
29: Revolving electric motor (Second electric motor)
31: Inverter unit
32: Floor plate
35: Vibration isolating member
36: Inverter assembly
37, 70: Support bracket
38: Lower side mounting member
39A: Inlet line fixing projection piece (Line fixing tool)
39B: Outlet line fixing projection piece (Line fixing tool)
41A, 44A: Cable fixing projection piece for electricity storage device (Cable fixing tool)
41B: Cable fixing projection piece for revolving electric motor (Cable fixing tool)
43: Upper side mounting member
44B: Cable fixing projection piece for assist generator motor (Cable fixing tool)
46: First inverter
50: Cable for assist generator motor (Cable)
51: Cable for electricity storage device (Cable)
53: Inlet line
54: Connecting line
55, 72: Second inverter
59: Cable for revolving electric motor (Cable)
60: Cable for electricity storage device (Cable)
62: Outlet line
71: Upper side mounting member (Mounting member)

The invention claimed is:

1. A hybrid-type working machine comprising:
an automotive vehicle body provided with a working mechanism;
an engine that is disposed on said vehicle body and drives a hydraulic pump;
a first electric motor that is driven by said engine to generate power or assists in a drive of said engine by supply of power;
an electricity storage device that stores power generated by said first electric motor or discharges power therein;
a second electric motor that is driven by power supplied from said electricity storage device or supplies regeneration power generated by a regeneration operation to said electricity storage device;
a first inverter for controlling an operation of said first electric motor; and
a second inverter for controlling an operation of said second electric motor, characterized in that:
said first inverter and said second inverter are mounted on a support bracket elastically supported on said vehicle body in a position different from a position where said electricity storage device is mounted,
said first inverter and said second inverter are connected by a connecting line in which a cooling medium for cooling said first inverter and said second inverter circulates,
said support bracket, said first inverter, said second inverter and said connecting line are configured as an inverter assembly,
an inlet line is connected to one inverter of said first inverter and said second inverter, said inlet line causing the cooling medium for cooling said first inverter and said second inverter to flow into said one inverter, and an outlet line is connected to said other inverter, said outlet line causing the cooling medium having cooled said first inverter (46) and said second inverter to flow out, a plurality of cables are connected respectively to said first inverter and said second inverter, and said support bracket is provided with cable fixing tools for fixing said plurality of cables respectively and line fixing tools for fixing said inlet line and said outlet line respectively.

2. The hybrid-type working machine according to claim 1, wherein said support bracket comprises:

a lower side mounting member that is positioned in a lower side in an upper-lower direction and on which one inverter of said first inverter and said second inverter is mounted; and an upper side mounting member that is positioned in an upper side from said lower side mounting member and on which the other inverter is mounted.

3. The hybrid-type working machine according to claim 1, wherein said support bracket is mounted on said vehicle body through a plurality of vibration isolating members.

4. The hybrid-type working machine according to claim 1, wherein said first inverter and said second inverter are composed of common components and are formed in the same configuration.

5. The hybrid-type working machine according to claim 1, wherein one inverter of said first inverter and said second inverter is mounted on an upper surface side, and the other inverter is mounted on a lower surface side in a state of being reversed to said one inverter in the upper-lower direction on a mounting member configuring said support bracket.

6. The hybrid-type working machine according to claim 1, wherein said vehicle body comprises a lower traveling structure and an upper revolving structure provided on said lower traveling structure to be able to revolve thereon, said upper revolving structure includes:

a revolving frame;

said engine mounted on a rear side of said revolving frame in a horizontal state extending in a left-right direction;

said hydraulic pump provided in one side of said engine in the left-right direction;

a cooling fan provided in the other side of said engine in the left-right direction to suck outside air as cooling air; and a heat exchanger positioned upstream side of said cooling fan in a flow direction of said cooling air and mounted on said revolving frame, wherein said electricity storage device positioned upstream side of said heat exchanger in the flow direction of said cooling air and mounted on said revolving frame, and said first inverter and said second inverter mounted on said support bracket are disposed in a utility room positioned in front side of said electricity storage device in a front-rear direction of said vehicle body.

* * * * *